(12) United States Patent
Kubo et al.

(10) Patent No.: US 6,560,278 B2
(45) Date of Patent: May 6, 2003

(54) RECEIVER AND AN ADAPTIVE EQUALIZER METHOD

(75) Inventors: Hiroshi Kubo, Tokyo (JP); Akihiro Okazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 46 days.

(21) Appl. No.: 09/793,774

(22) Filed: Feb. 27, 2001

(65) Prior Publication Data

US 2001/0006533 A1 Jul. 5, 2001

(30) Foreign Application Priority Data

Jul. 7, 1999 (JP) .......................................... 11-193147

(51) Int. Cl.[7] .............................................. H03H 7/30
(52) U.S. Cl. ...................................................... 375/232
(58) Field of Search ................................ 375/232, 230, 375/233

(56) References Cited

U.S. PATENT DOCUMENTS

| | | | |
|---|---|---|---|
| 5,081,651 A | | 1/1992 | Kubo |
| 5,146,475 A | | 9/1992 | Kubo |
| 5,164,964 A | | 11/1992 | Kubo |
| 5,333,148 A | * | 7/1994 | Tsubaki et al. ............. 329/304 |
| 5,448,601 A | | 9/1995 | Choi |
| 5,787,118 A | * | 7/1998 | Ueda .......................... 375/232 |
| 5,809,009 A | * | 9/1998 | Matsuoka et al. .......... 370/206 |

FOREIGN PATENT DOCUMENTS

JP 6-216810 A 8/1994

OTHER PUBLICATIONS

"Linear Equalization Theory,—Adaptive Digital Signal Processing—" Yoichi Sato, Maruzen K.K.
"Adaptive maximum–likelihood sequence estimation by means of combined equalization and decoding in fading environments" H. Kubo, et al. IEEE JSAC, pp 102–109.
"An Adaptive Soft–Output Viterbi Equalizer for Fast Time–Varying Frequency Selective Fading" Takayuki Nagayasu, et al. The Institute of Electronics Information and Communication Engineers.
"Comparison on maximum–likelihood sequence estimator schemes incorporating carrier phase estimation" H. Kubo, et al. IEEE Trans. Commun., pp 14–17.

* cited by examiner

Primary Examiner—Stephen Chin
Assistant Examiner—Kevin Kim
(74) Attorney, Agent, or Firm—Oblon, Spivak, McClelland, Maier & Neustadt, P.C.

(57) ABSTRACT

An over-sample sampler 3 samples a received signal at a speed of not less than a symbol rate, and a received sequence output circuit 4 distributes the sampled signal sequence to sequences of different over-sample timing numbers. Thereafter, a plurality of blind equalizers with reliability information 5A, 5B and 5C receive the distributed signal sequences and perform an adaptive equalizer process so as to output decision data and reliability information. Finally, a decision data selecting circuit 6 receives plural pieces of reliability information and decision data and outputs decision data with the highest reliability as a decision value.

32 Claims, 18 Drawing Sheets

SAMPLING POINT AT WHICH EQUALIZATION IS PERFORMED

SAMPLING POINT AT WHICH EQUALIZATION IS NOT PERFORMED

RECEIVER AND AN ADAPTIVE EQUALIZER METHOD

TECHNICAL FIELD

This invention in general relates to a receiver to be used for a mobile phone or the like. More specifically, this invention relates to the receiver and an adaptive equalizer method in the receiver which judges data without utilizing a training sequence for an operation of an adaptive equalizer.

BACKGROUND ART

A conventional receiver and adaptive equalizer method will be explained below. For example, in wireless communication such as a mobile phone, a non-ignorable delay wave is occasionally generated in a data symbol due to multipath propagation. If such a delay wave is generated, interference occurs between code symbols. This phenomenon is called as inter-symbol interference. For this reason, an equalizing technique, for example, exists as a receiving technique which overcomes the inter-symbol interference.

FIG. 20 shows a structure of an adaptive equalizer adopted by a conventional receiver. In FIG. 20, legend 1 denotes a received signal input terminal, legend 2 denotes a decision value output terminal, legend 3 denotes an over-sample sampler, legend 100 denotes a symbol rate data output circuit, legend 101 denotes a timing detector utilizing a training sequence, and legend 102 denotes an equalizer utilizing a training sequence.

Operation of this receiver will now be explained. FIG. 21 is a diagram showing a principle of an over-sample by the receiver. For example, FIG. 21 shows an example of 8-time over-sample, namely, the case where sampling is performed eight times with 1 symbol cycle. Here, sampling time is represented by integer numbers, and over-sample timing numbers corresponding to the sampling time are represented by eight numbers from '0' to '7'. Namely, in a sequence where the over-sample timing number is "1", data of time '9' are output as symbol data next to time '1'. For example, when the equalizer 102 operates based on the double over sampling, data of time '5' are output as over-sample data as symbol data next to time '1' in a sequence where the over-sample timing number is '1'. However, a received sequence will be explained as symbol rate data, but over-sample data can be treated by similar concept.

In FIG. 20 and FIG. 21, a received signal is first sampled at predetermined timing by the over-sample sampler 3. Next, the timing detector 101 receives the over-sampled received signal and determines over-sample timing numbers shown in FIG. 21 by utilizing a training sequence which is a known pattern. Next, the symbol rate data output circuit 100 receives the over-sample timing number, and outputs a received sequence of a symbol rate corresponding to this number. Finally, the equalizer 102 utilizing a training sequence receives the received sequence of the symbol rate, and creates a decision value which is an estimated value of a transmission data sequence so as to output the decision value from the decision value output terminal 2.

In such a manner, normally, the receiver, which uses the equalizer 102 utilizing a training sequence, once estimates a position of a training sequence in any manner so as to operate.

Meanwhile, in addition to such an adaptive equalizer utilizing a training sequence, an equalizer which does not require a training sequence exists. This is referred to as a blind equalizer (for example, described in "Linear Equalization Theory" written by Yoichi Sato, Maruzen, 1990). Since a blind equalizer operates without utilizing a training sequence, the above-mentioned process utilizing training can be avoided.

FIG. 22 shows a structure of a conventional receiver using a blind equalizer described in "Synchronization Establishing System for Equalizer" written by Masaaki Fujii (Japanese Patent Application Laid-Open No. 6-216810 (1994)) In FIG. 22, legend 1 denotes a received signal input terminal, legend 2 denotes a decision value output terminal, legend 3 denotes an over-sample sampler, legend 111 denotes a received signal storage circuit, legend 102 denotes an equalizer utilizing a training sequence, legends 103A, 103B and 103C denote blind equalizers with UW (unique word) detecting function, legend 104 denotes a UW portion error comparing circuit, and legend 105 denotes an optimum phase selecting circuit. Here, in later explanation, a training sequence and an unique word (UW) are treated as equivalent.

FIG. 23 shows an example of the structure of the blind equalizer 103 with UW detecting function shown in FIG. 22. In FIG. 23, legend 7 denotes a UW detector, legend 8 denotes a received sequence input terminal, legend 13 denotes a blind equalizer, legend 107 denotes an error output terminal, and legend 108 denotes a mask circuit.

Operation of the receiver shown in FIG. 22 will now be explained. At first, a received signal, which is over-sampled by the over-sample sampler 3, is once stored in the received signal storage circuit 111. Next, the received signal storage circuit 111 outputs an N-systemic received sequence, shown in FIG. 21, where over-sample timing number differs, and N-numbered blind equalizers 103A, 103B, . . . , 103C with UW detecting function receive received signals respectively.

Detailed operation of the blind equalizers with UW detecting function will now be explained with reference to FIG. 23. At first, the blind equalizer 13 which received the received sequence outputs a decision value and an error value. The UW detector 7 receives the decision value so as to detect UW and instructs the mask circuit 108 on mask for mask period other than UW detection time. The mask circuit 108 outputs an error value which was received except at mask instructing period.

Next, the UW portion error comparing circuit 104 receives N-numbered pieces of error information from the N-numbered blind equalizers 103 with UW detecting function, and outputs timing corresponding to a received sequence where the error is the smallest. The optimum phase selecting circuit 105 selects a received sequence of a symbol rate from the received signal storage circuit 111 according to the timing instruction from the UW portion error comparing circuit 104, and outputs the received sequence. Finally, the equalizer 102 receives the received sequence, and performs an adaptive equalizer process utilizing a training sequence so as to output a decision value from the decision value output terminal 2.

As mentioned above, in the conventional blind equalizers, an error signal to be used for timing selection is generated. As a result, this is equivalent to the case where the timing detector 101 utilizing a training sequence in FIG. 20 is realized by utilizing the blind equalizers 103A to 103C with UW detecting function in FIG. 22. Namely, decision values of the blind equalizers with UW detecting function are not utilized as a decision value of the adaptive equalizer process.

However, in the conventional receiver described in the above publication, there arises the following problems:

(1) In order that the adaptive equalizer operates, before the adaptive equalizer operates, a position of a training sequence should be known.

(2) Even if the blind equalizers are utilized, the equalizer which has another structure and utilizes a training sequence is required at a later stage.

(3) It is difficult to reproduce stable timing in an environment of inter-symbol interference.

SUMMARY OF THE INVENTION

The present invention is devised in order to solve the above problems. It is an object of the present invention to provide a receiver which is capable of reproducing stable timing even in the environment of inter-symbol interference and outputting a decision value in an adaptive equalizer process only using a blind equalizer without utilizing a training sequence, and relates to an adaptive equalizer method in the receiver.

A receiver of the present invention having an adaptive equalizer which judges a transmission data sequence by means of an adaptive equalizer process comprises a sampling unit which samples a received signal at a speed of not less than a symbol rate; a signal sequence distributing unit which distributes the sampled signal to at least one signal sequence with different sampling timing; a plurality of blind equalization units with reliability information which output decision values (symbol sequences) and their reliability information correspondingly to the respective signal sequences without utilizing a training sequence; and a decision value selecting unit which selects an optimum decision value based on the plural pieces of reliability information.

According to the above aspect of this invention, the sampling unit samples a received signal at a speed of not less than a symbol rate, and the signal sequence distributing unit distributes the sampled signal sequence to sequences with different over-sample timing numbers. Thereafter, the blind equalization unit with reliability information receive the distributed signal sequences and perform the adaptive equalizer process so as to output decision data and reliability information. Finally, the decision value selecting unit receives plural pieces of reliability information and the decision data so as to output the decision data with the highest reliability as a decision value.

Further, the blind equalization unit with reliability information include a blind equalization unit which outputs soft decision values to which reliability for each symbol is added; and a reliability accumulation unit which receives the soft decision values per symbol and outputs a cumulative value of the reliabilities as reliability information.

According to this invention, the blind equalization unit receive the received sequence and outputs soft decision values which are obtained by adding reliability components of each symbol are added to the decision values. The reliability accumulation unit accumulates the reliabilities of each symbol of the soft decision values so as to output reliability information. Here, when a lot of reliability components exist in the soft decision values, the reliability information as the cumulative value show a large value.

Further, the blind equalization unit with reliability information include a blind equalization unit which receives the signal sequence and outputs square errors which are generated when data are judged as well as the decision values; and a reliability accumulation unit which outputs a cumulative value of the square errors as reliability information.

According to this invention, the blind equalization unit receive the received sequence and output square errors which are generated when data are judged as well as the decision values. The reliability accumulation unit accumulates the square errors so as to output the cumulative value. Here, as the square error cumulative value is smaller, the reliability becomes higher.

Further, a frequency deviation addition unit which adds a frequency deviation is provided at a stage before the blind equalization unit with reliability information.

The frequency deviation addition unit gives different frequency deviations to the received sequences to be supplied to the blind equalization unit with reliability information so that selection of decision data is effective even at the same over-sample timing number.

Further, a synchronization judging unit, which performs unique word detection in order to obtain synchronization utilizing the decision values output by the plurality of blind equalization units with reliability information so as to detect as to whether being in a synchronous state or in an asynchronous state, is provided.

For example, when two unique words are detected from the decision values and a number of symbols of the unique words matches with a known value, a synchronous state is obtained. Meanwhile, when two unique words are detected and a number of symbols of the unique words does not match a known value, or when one unique words is not detected, an asynchronous state is obtained.

A receiver of next invention having an adaptive equalizer which judges a transmission data sequence by means of an adaptive equalizer process, comprises a sampling unit which samples a received signal at a speed of not less than a symbol rate; a signal storage unit which stores the sampled signal; a blind equalization unit with reliability information which receive a signal sequence from the signal storage unit and outputs decision values and their reliability information without utilizing a training sequence operating at a clock faster than a signal sequence cycle; and a timing control unit which controls time at which the signal sequence is output and operation time of the blind equalization unit with reliability information so as to output decision data with the highest reliability as decision values.

Thus, the sampling unit samples a received signal at a speed of not less than a symbol rate, and the signal storage unit stores the over-sampled received signal. Thereafter, an over-sample timing number indicated by the operation timing control unit is output at specified timing and at a speed faster than the symbol rate. Finally, the blind equalization unit with reliability information receives a received sequence at a speed faster than a symbol rate and outputs reliability information and decision data.

Further, the blind equalization unit with reliability information includes a blind equalization unit which outputs soft decision values to which reliability for each symbol is added; and a reliability accumulation unit which receives the soft decision values per symbol and outputs a cumulative value of the reliability as reliability information.

Thus, the blind equalization unit receives a received sequence and outputs soft decision values which are obtained by adding reliability components of each symbol to the decision values. The reliability accumulation unit accumulates the reliabilities of each symbol of the soft decision values so as to output reliability information. Here, when a lot of reliability components exist in the soft decision values, the reliability information as the cumulative value shows a large value.

Further, the blind equalization unit with reliability information includes a blind equalization unit which receives the signal sequence and outputs square errors which are generated when data are judged as well as the decision values; and a reliability accumulation unit which outputs a cumulative value of the square errors as reliability information.

Thus, the blind equalization unit receives a received sequence, and outputs square errors which are generated when data are judged as well as the decision values. The reliability accumulation unit accumulates the square errors so as to output the cumulative value. Here, as the square error cumulative value is smaller, the reliability becomes higher.

Further, a frequency deviation addition unit which adds a frequency deviation is provided at a stage before the blind equalization unit with reliability information.

The frequency deviation addition unit gives different frequency deviations to received sequences to be supplied to the blind equalization unit with reliability information so that selection of the decision data is effective even at the same over-sample timing number.

Further, length of a channel memory which is a parameter of the blind equalization unit with reliability information and the frequency deviation can be controlled.

The timing control unit forcibly changes a channel memory length which is a parameter of the blind equalization unit with reliability information and frequency deviations given by the frequency deviation addition unit.

Further, a synchronization judging unit which performs unique word detection in order to obtain synchronization using the decision values and making a judgment as to whether being in a synchronous state or in an asynchronous state, is provided.

The synchronization judging unit makes a judgment as to where the receiver is in a synchronous state or in an asynchronous state by utilizing the decision values. As a result, the over-sample timing number of the signal sequence is changed. For example, when the synchronization is not established, intervals between the over-sample timing numbers are distributed thoroughly. Meanwhile, when the synchronization is established, the intervals between the over-sample timing numbers are set finely so that accuracy of the timing synchronization is heightened.

Further, a synchronization judging unit which performs unique word detection in order to obtain synchronization for each of the blind equalization units with reliability information and making a judgment as to whether being in a synchronous state or in an asynchronous state individually, is provided.

Each synchronization judging unit performs unique word detection on the decision data output by the blind equalization unit with reliability information, and outputs the detected results and detection timing. Further, the decision value selecting unit selects a decision value using not only the reliability information but also the unique word detected results and detection timing.

Further, a reproduction timing generating unit which generates a reproduction timing signal based on timing information including output timing of the optimum decision value and the unique word detected result, is provided.

The decision value selecting unit creates timing information including the finally selected timing and unique word detected result. Further, the reproduction timing generating unit outputs a reproduction timing signal based on the timing information to be a reference.

Further, a reproduction timing generating unit which generates a reproduction timing signal based on timing information including output timing of the optimum decision value and the unique word detected result, is provided.

The decision value selecting unit generates timing information including the finally selected timing and unique word detected result. Further, the reproduction timing generating unit outputs a reproduction timing signal based on the timing information to be a reference.

Further, a reproduction timing generating unit which generates a reproduction timing signal based on timing information including output timing of the decision value and the unique word detected result, is provided.

The timing control unit generates timing information including the finally selected timing and unique word detected result. Further, the reproduction timing generating unit outputs a reproduction timing signal based on the timing information to be a reference.

Further, the sampling unit samples a plurality of received signals individually at a speed of not less than a symbol rate.

A plurality of sampling unit are provided, and a frequency of an operation clock of the blind equalization unit with reliability information is given so that a plurality of different received signals are processed.

An adaptive equalizer method according to next invention of judging a transmission data sequence comprises the sampling step of sampling a received signal at a speed of not less than a symbol rate; the signal sequence distributing step of distributing the sampled signal to at least one signal sequence with different sampling timing; the decision value/reliability information output step of outputting decision values and their reliability information correspondingly to the respective signal sequences without utilizing a training sequence; and the decision value selecting step of selecting an optimum decision value based on the plural pieces of reliability information.

According to the above-mentioned aspect of this invention, a received signal is sampled at a speed of not less than a symbol rate by the sampling step. The sampled signal sequence is distributed to sequences with different over-sample timing numbers. Thereafter, at the decision value/reliability information output step, the distributed signal sequences, and decision data and reliability information are output by executing an adaptive equalizer process. Finally, at the decision value selecting step, a plural pieces of reliability information and decision data are received, and the decision data with the highest reliability are output as a decision value.

Further, the decision value/reliability information output step includes the soft decision value output step of outputting soft decision values to which reliability of each symbol is added; and the reliability cumulative step receiving the soft decision values of each symbol so as to output a cumulative value of the reliabilities as reliability information.

At the soft decision value output step, soft decision values which are obtained by adding reliability components of each symbol to the decision values are output, and at the reliability cumulative step, the reliabilities of each symbol of the soft decision values are cumulated so that the reliability information is output. Here, when a lot of reliability components exist in the soft decision values, the reliability information as the cumulative value shows a large value.

Further, the decision value/reliability information output step includes the square error output step of receiving the signal sequence and outputs square errors which are generated when data are judged as well as the decision values; and the reliability cumulative step of outputting a cumulative value of the square errors as reliability information.

At the decision value/reliability information output step, square errors which are generated when data are judged as well as the decision values are output, and at the reliability cumulative step, the square errors are cumulated so that the cumulative value is output. Here, as the square error cumulative value is smaller, its reliability becomes higher.

Further, the frequency deviation adding step of adding a frequency deviation is provided before the decision value/reliability information output step is executed.

At the frequency deviation adding step, different frequency deviations are given to the received sequence so that the selection of the decision data is effective even at the same over-sample timing number.

Further, the synchronization judging step of performing unique word detection in order to obtain synchronization using the plural decision values and making a judgment as to whether or not being in a synchronous state or in an asynchronous state, is provided.

For example, when two unique words are detected from the decision values and a number of symbols of the unique words matches with a known value, the synchronous state is obtained. Meanwhile, when the two unique words are detected and a number of symbols of the unique words does not match with the known value, or when one unique words is not detected, the asynchronous state is obtained.

An adaptive equalizer method according to next invention of judging a transmission data sequence comprises the sampling step of sampling a received signal at a speed of not less than a symbol rate; the signal storage step of storing the sampled signal; the decision value/reliability information output step of receiving a signal sequence stored at the signal storage step and operating at a clock faster than a signal sequence cycle so as to output decision values and their reliability information without utilizing a training sequence; and timing control step of controlling time at which the signal sequence is output and operation time of the decision value/reliability information output step so as to output decision data with the highest reliability as a decision value.

According to the above-mentioned aspect of this invention, a received signal is sampled at a speed of not less than a symbol rate by the sampling step. The received signal over-sampled is stored at the signal storage step. Thereafter, an over-sample timing number which is indicated at the operation timing control step is output at specified timing and at a speed faster than the symbol rate. Finally, at the decision value/reliability information output step, a received sequence is received at a speed faster than the symbol rate, and reliability information and decision data are output.

Further, the decision value/reliability information output step includes the soft decision value output step of outputting soft decision values to which reliability of each symbol is added; and the reliability cumulative step of receiving the soft decision values of each symbol and outputs a cumulative value of the reliabilities as reliability information.

At the soft decision value output step, soft decision values which are obtained by adding reliability components of each symbol to the decision values are output. At the reliability cumulative step, the reliabilities of each symbol of the soft decision values are cumulated so that the reliability information is output. Here, when a lot of reliability components exist in the soft decision values, the reliability information as the cumulative value shows a large value.

Further, the decision value/reliability information output step includes the square error output step of receiving the signal sequence and outputs square errors which are generated when data are judged as well as the decision values; and the reliability cumulative step of a cumulative value of the square errors as reliability information.

At the decision value/reliability information output step, square errors which are generated when data are judged as well as the decision values are output. The reliability cumulative step, the square errors are cumulated so that the cumulative value is output. Here, as the square error cumulative value is smaller, its reliability becomes higher.

Further, the frequency deviation adding step of adding a frequency deviation is provided before the decision value/reliability information output step is executed.

At the frequency deviation adding step, different frequency deviations are given to a received sequence so that selection of decision data is effective at the same over-sample timing number.

Further, length of channel memory which is a parameter at the decision value/reliability information output step and the frequency deviation can be controlled.

At the timing control step, channel memory length which is a parameter of the decision value/reliability information output step and the frequency deviations given at the frequency deviation adding step are changed forcibly.

Further, the synchronization judging step of performing unique word detection in order to obtain synchronization utilizing the decision values and making a judgment as to being in a synchronous state or in an asynchronous state, is provided.

At the synchronization judging step, a judgment is made as to whether the receiver is in a synchronous state or in an asynchronous state by utilizing the decision values. As a result, the over-sample timing number of the signal sequence is changed. For example, when the synchronization is not established, intervals between the over-sample timing numbers are distributed thoroughly, whereas when the synchronization is established, the intervals between the over-sample timing numbers are set finely so that the accuracy of timing synchronization is heightened.

Further, the synchronization judging step of performing unique word detection in order to obtain synchronization in the unit of the decision value/reliability information output step of outputting the decision values and their reliabilities and making a judgment as to whether being in a synchronous state or in an asynchronous state, is provided.

At the synchronization judging step, unique words are detected based on the decision data output from the plural blind equalization units, and the detected results and detection timing are output. Further, at the decision value selecting step, the decision value is selected by using not only the reliability information but also the unique word detected results and the detection timing.

Further, the reproduction timing generating step of generating a reproduction timing signal based on timing information including output timing of the optimum decision value and the unique word detected result, is provided.

At the decision value selecting step, timing information including finally selected timing and the unique word detected results is generated. Further, at the reproduction timing generating step, a reproduction timing signal is output based on the timing information to be a reference.

Further, the reproduction timing generating step of generating a reproduction timing signal based on timing information including output timing of the optimum decision value and the unique word detected result, is provided.

At the decision value selecting step, timing information including finally selected timing and the unique word detected results is generated. Further, at the reproduction timing generating step, a reproduction timing signal is output based on the timing information to be a reference.

Further, the reproduction timing generating step of generating a reproduction timing signal based on timing information including output timing of the decision values and the unique word detected result, is provided.

At the timing control step, timing information including finally selected timing and the unique word detected results is generated. Further, at the reproduction timing generating step, a reproduction timing signal is output based on the timing information to be a reference.

Further, the sampling step samples a plurality of received signals at a speed of not less than a symbol rate individually.

A plurality of received signals are sampled individually, and frequencies of an operation clock of the blind equalizers are given sot hat the plural different received signal are processed.

BEST MODE FOR CARRYING OUT THE INVENTION

In order to detail the present invention, an explanation will be given with reference to the attached drawings.

Figure 1:
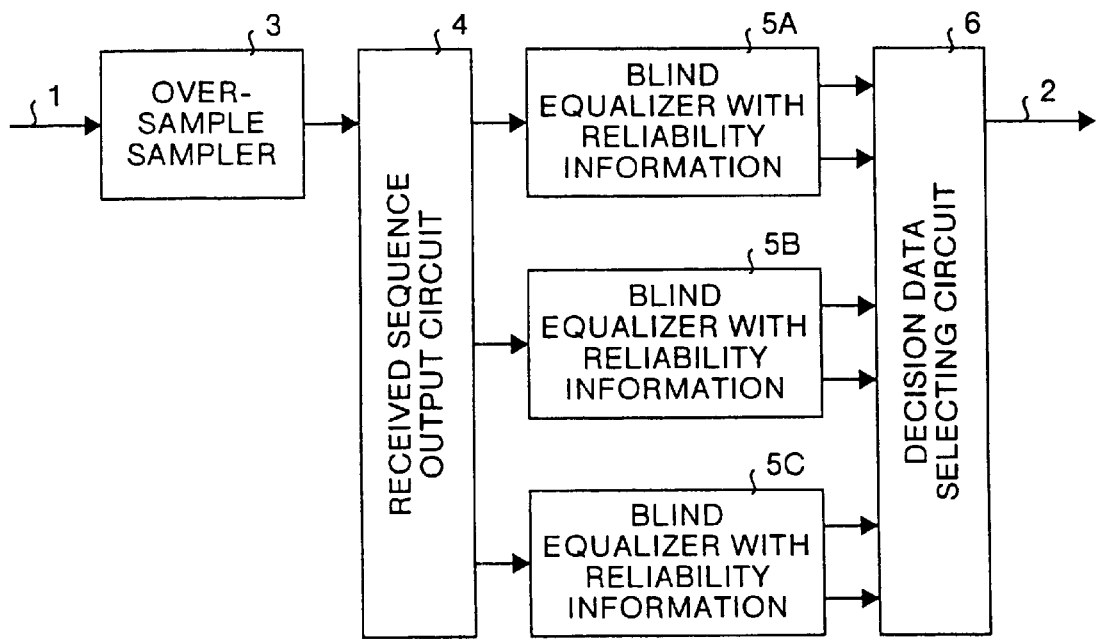
FIG. 1 shows a structure of a receiver according to a first embodiment of the present invention.

At first, a structure of a receiver according to a first embodiment of the present invention will be explained. FIG. 1 shows a structure of the receiver according to a first embodiment of the present invention. In FIG. 1, legend 1 denotes a received signal input terminal, legend 2 denotes a decision value output terminal, legend 3 denotes an over-sample sampler, legend 4 denotes a received sequence output circuit, legends 5A, 5B, 5C, . . . denote blind equalizers with reliability information, and legend 6 denotes a decision data selecting circuit.

Figure 2:
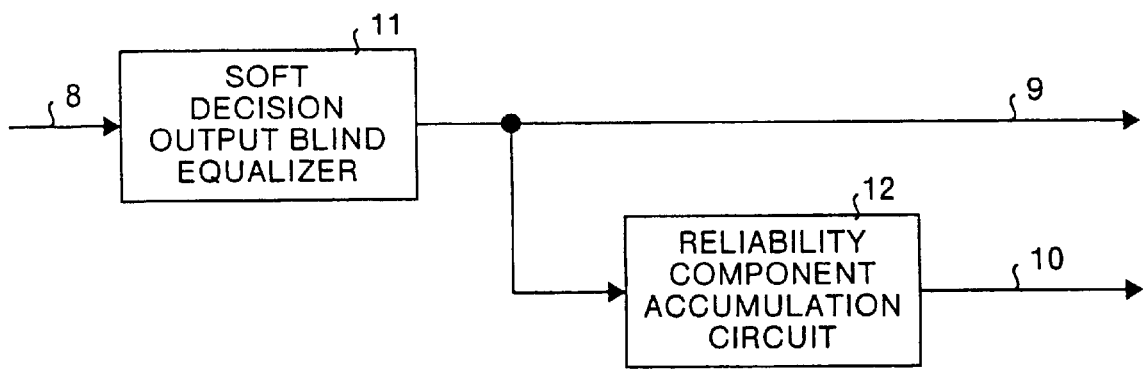
FIG. 2 is a diagram showing a structural example of a blind equalizer with reliability information.

FIG. 2 is a diagram showing a structural example of the blind equalizer with reliability information. In FIG. 2, legend 8 denotes a received sequence input terminal, legend 9 denotes a decision data output terminal, legend 10 denotes a reliability information output terminal, legend 11 denotes a soft decision output blind equalizer, and legend 12 denotes a reliability component accumulation circuit.

Figure 3:
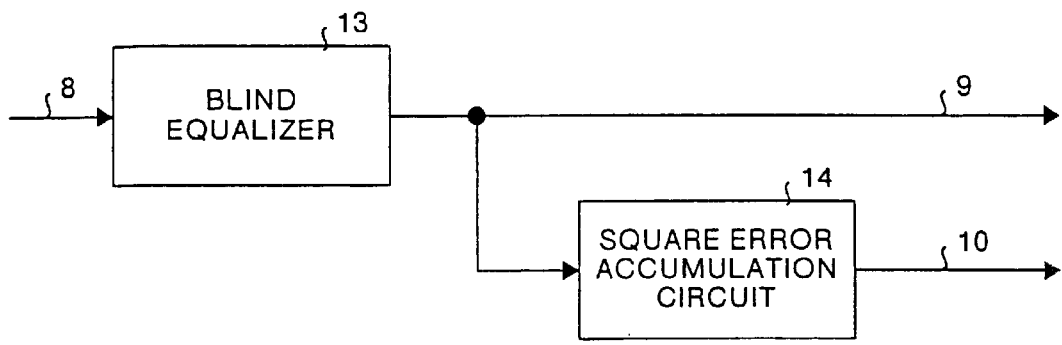
FIG. 3 is a diagram showing a structural example of a blind equalizer with reliability information different from FIG. 2.

FIG. 3 is a diagram showing a structural example of the blind equalizer with reliability information different from FIG. 2. In FIG. 3, legend 13 denotes a blind equalizer, and legend 14 denotes a square error cumulative circuit. Here, the same legends are provided to the components which are the same as those in FIG. 2 explained above, and the description thereof is omitted.

Operation of the receiver of the present embodiment will now be explained. At first, a received signal is sampled by the over-sample sampler 3 at a speed of not less than a symbol rate. Next, the received sequence output circuit 4 distributes the over-sampled received signal as a plurality of received sequences to sequences with different over-sample timing numbers. Here, signal sequences of the same sampling timing are occasionally allowed to exist.

Next, the N-numbered blind equalizers 5A to 5C with reliability information receive the received sequences individually from the received sequence output circuit 4, and perform an adaptive equalizer process without utilizing a training sequence, and outputs decision data and reliability information. The reliability information does not represent reliability per symbol such as soft decision values but represents reliability of whole data sequence. Moreover, there exist the blind equalizers with reliability information, a number of which is the same as a number of signal sequences with different sampling timing or is larger than this number.

Finally, the decision data selecting circuit 6 receives N-numbered pieces of reliability information and decision data, and outputs decision data output by the blind equalizer with the highest reliability information as a decision value.

As mentioned above, the present embodiment has the above structure so that data can be judged stably without utilizing a training sequence. Here, a method of realizing the blind equalizer is detailed in, for example, "Adaptive maximum-likelihood sequence estimation by means of combined equalization and decoding in fading environments" written by H. Kubo and the others (IEEE JSAC, pp. 102–109, 1995).

Methods of realizing the blind equalizers with reliability information shown in FIG. 2 and FIG. 3 will now be explained. For example, FIG. 2 shows a method of realizing the blind equalizers with reliability information 5A to 5C shown in FIG. 1. A method of realizing the soft decision output blind equalizer 11 is detailed in, for example, "An Adaptive Soft-Output Viterbi Equalizer for Fast Time-Varying Frequency Selective Fading" by Nagayasu et. al., (literature of IEICE B-II, pp.397–386, 1997). Moreover, as is clear from "Comparison on maximum-likelihood sequence estimator schemes incorporating carrier phase estimation" written by H. Kubo and the others (IEEE Trans. Commun., pp. 14–17, 1999), multiplex differential detection which is one kind of differential detection (including differential detection) can be treated as one example of the blind equalizer.

The soft decision output blind equalizer 11 shown in FIG. 2 receives a received sequence, and outputs soft decision values which are obtained by adding reliability components for respective symbols to decision values. The reliability component accumulation circuit 12 accumulates reliability for each symbol of the soft decision values and outputs reliability information. Namely, when a lot of reliability components exist in the soft decision values, the reliability information which are the cumulative value of the reliability components show a large value.

Meanwhile, FIG. 3 shows another method of realizing the blind equalizers with reliability information 5A and 5B in FIG. 3. The blind equalizer 13 receives a received sequence and outputs a square error (for example, a metric normalized value of a Viterbi equalizer) which is generated when data are judged as well as a decision value. As described in "Adaptive maximum-likelihood sequence estimation by means of combined equalization and decoding in fading environments" written by H. Kubo and the others (IEEE JSAC, pp. 102 to 109, 1995), when the blind equalizer 13 operates based on a Viterbi algorithm, an operation for normalizing each symbol time using the smallest path metric (square error) is utilized, and the smallest path metric is to be a square error which is used in the square error cumulative circuit 14. Therefore, the square error cumulative circuit 14 accumulates the square errors so as to output it. Here, as the square error cumulative value is smaller, its reliability is higher.

In addition, the received sequence output circuit 4 normally outputs received signals of different over-sample timing numbers to the respective blind equalizers with reliability information 5. However, for example, thirty-two blind equalizers with reliability information are prepared in FIG. 1 (N=32), eight received sequences of different over-sample timing numbers are supplied to the eight blind equalizers with reliability information which are classified by four parameters (for example, a channel memory length). Such a method (4×8=32) is considered. This process enables stable data demodulation even in wider channels.

In addition, in the respective blind equalizers with reliability information, if parameters are different, weighting factors which are multiplied by reliability information between different parameters have different values (normally, all the factors are 1, but the factor is 1 for a certain parameter and the factor is 2 for another parameter). As a result, selecting accuracy of decision values can be improved.

Figure 4:
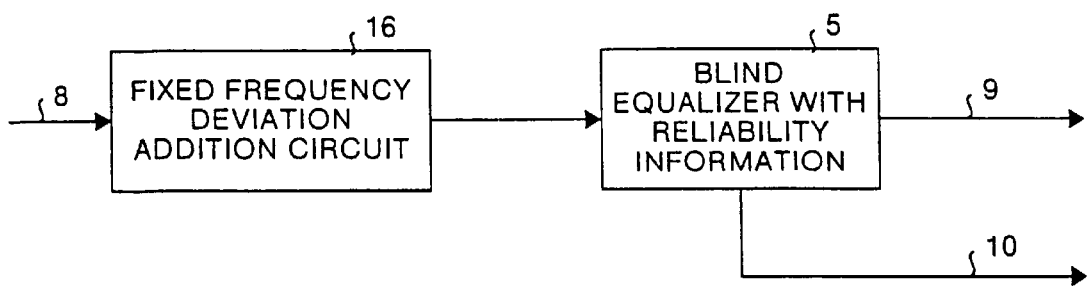
FIG. 4 shows a structure of a blind equalizer with reliability information different from FIG. 2 and FIG. 3.

FIG. 4 shows a structure of the blind equalizer with reliability information different from FIG. 2 and FIG. 3. In FIG. 4, legend 5 denotes the aforementioned blind equalizer with reliability information of FIG. 2 or FIG. 3, legend 8 denotes the symbol rate received sequence input terminal, legend 9 denotes the decision data output terminal, legend 10 denotes the reliability information output terminal and legend 16 denotes a fixed frequency addition circuit.

In the blind equalizer with reliability information shown in FIG. 4, for example, when the fixed frequency deviation addition circuit 16 gives a different frequency deviation to a received sequence to be supplied to the blind equalizer with reliability information 5, selection of decision data is effective even with the same over-sample timing number. In this case, the fixed frequency deviation addition circuit 16 is provided at a stage before the blind equalizer with reliability information 5 so that a forced frequency deviation is given. This process enables an amount of frequency deviation capable of being demodulated to be increased.

As mentioned above, in the present embodiment, it is not necessary to utilize a training sequence like a conventional art, and a decision value in the adaptive equalizer process can be output only by the process using the blind equalizers with reliability information.

Figure 5:
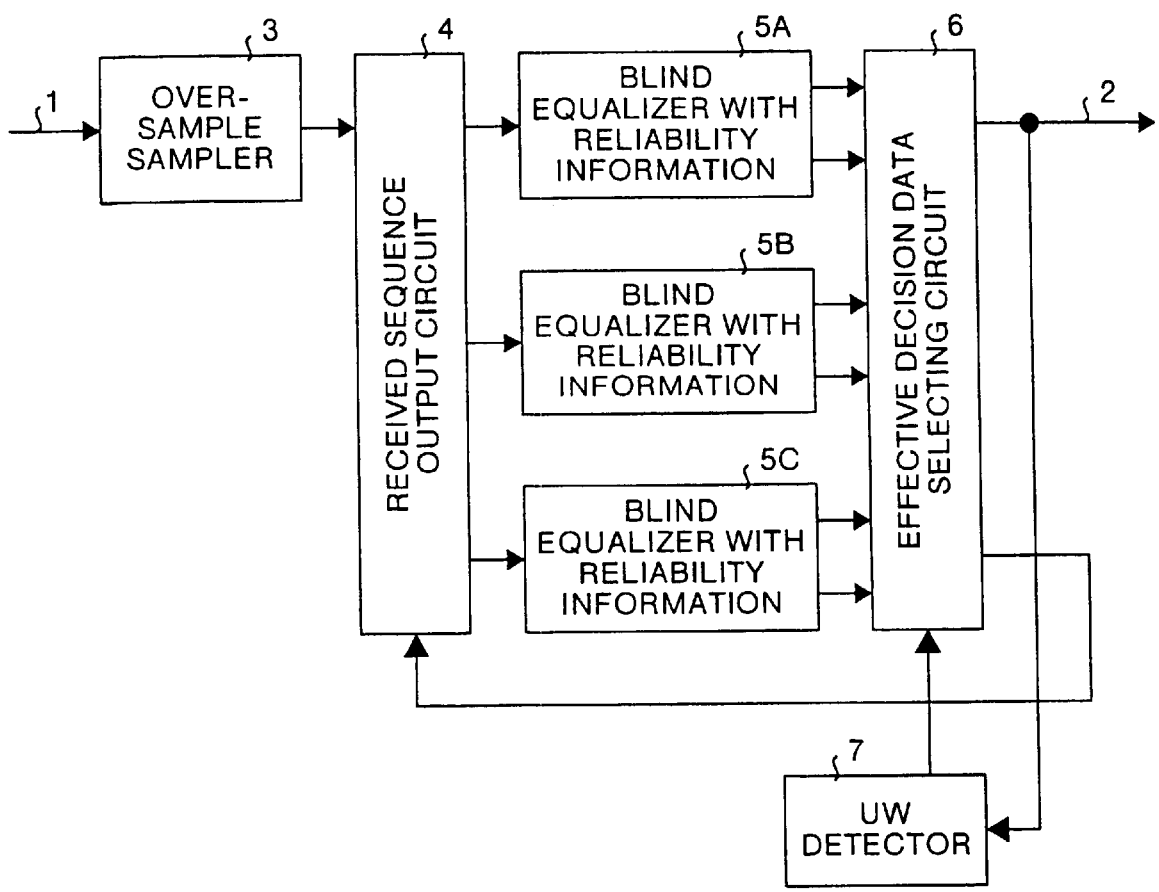
FIG. 5 shows a structure of the receiver according to a second embodiment of the present invention.

FIG. 5 shows a structure of the receiver according to a second embodiment of the present invention. In the present embodiment, the same legends are provided to the components which are the same as those in the aforementioned first embodiment, and the description thereof is omitted. In FIG. 5, legend 7 denotes a UW (unique word) detector.

In the present embodiment, the operation which is the same as that in the first embodiment is performed basically, but a difference with the first embodiment is that, for example, the UW detector 7 performs UW detection utilizing a decision value and makes a judgment as to whether the receiver is in a synchronous state or in an asynchronous state. Namely, the present embodiment is characterized in that the over-sample timing number of the received sequence output by the received signal output circuit 4 is changed by the judging process.

Figure 6:
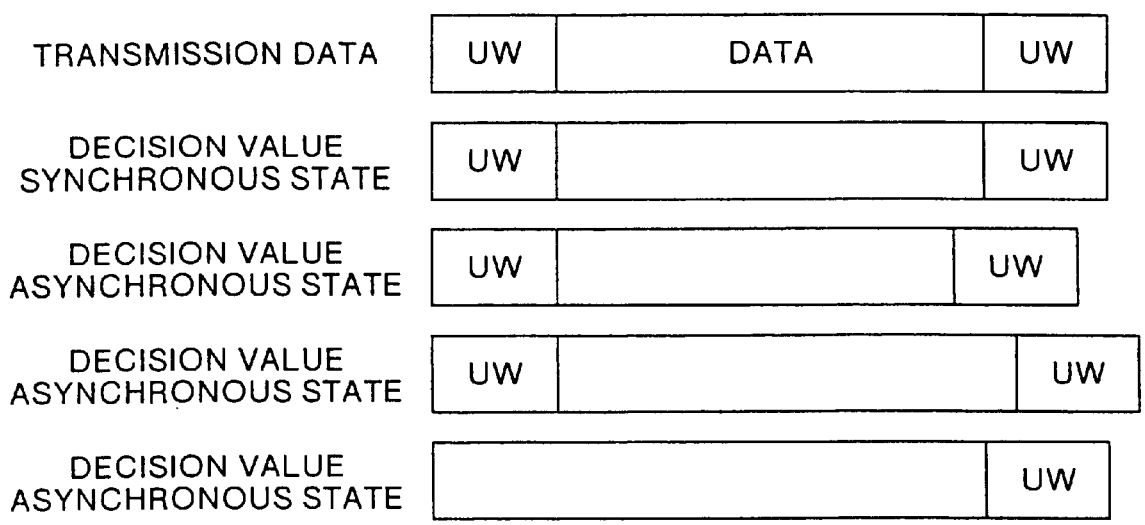
FIG. 6 is a diagram for explaining a synchronous/asynchronous state.

FIG. 6 is a diagram for explaining a synchronous/asynchronous state based on a relationship between transmission data and a decision value. For example, when two UWs are detected from the decision value and a number of symbols between UWs matches with a known value (a number of data symbols in the drawing), the receiver is in the synchronous state. Meanwhile, when two UWs are detected and a number of symbols between UWs is different from a known value, or when one UW cannot be detected, the receiver is in the asynchronous state. In the present embodiment, data which are judged as in the asynchronous state are not selected as decision data so that accuracy of a decision value is heightened.

In FIG. 7 to FIG. 10, as for the case where four blind equalizers with reliability information (N=4) are prepared, over-sample timing numbers which are selected by the received signal output circuit 4 at the time of 8-time over-sample are shown.

Figure 7:
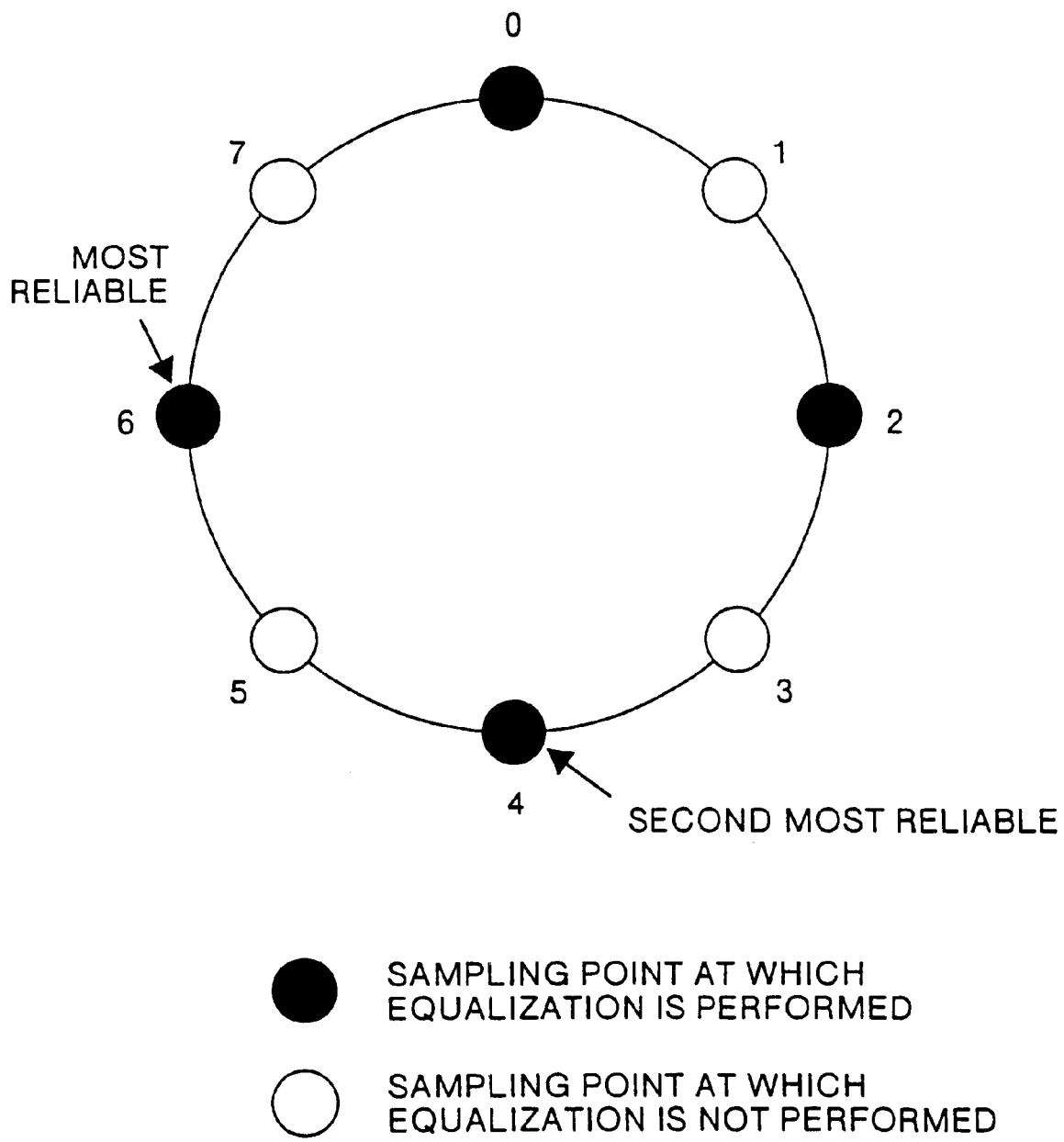
FIG. 7 is a diagram showing over-sample timing numbers under a condition that synchronization is not established.

At first, FIG. 7 shows over-sample timing numbers under a condition that synchronization is not established. Since synchronization is not established, the over-sample timing numbers '0', '2', '4' and '6' are selected uniformly, for example.

Figure 8:
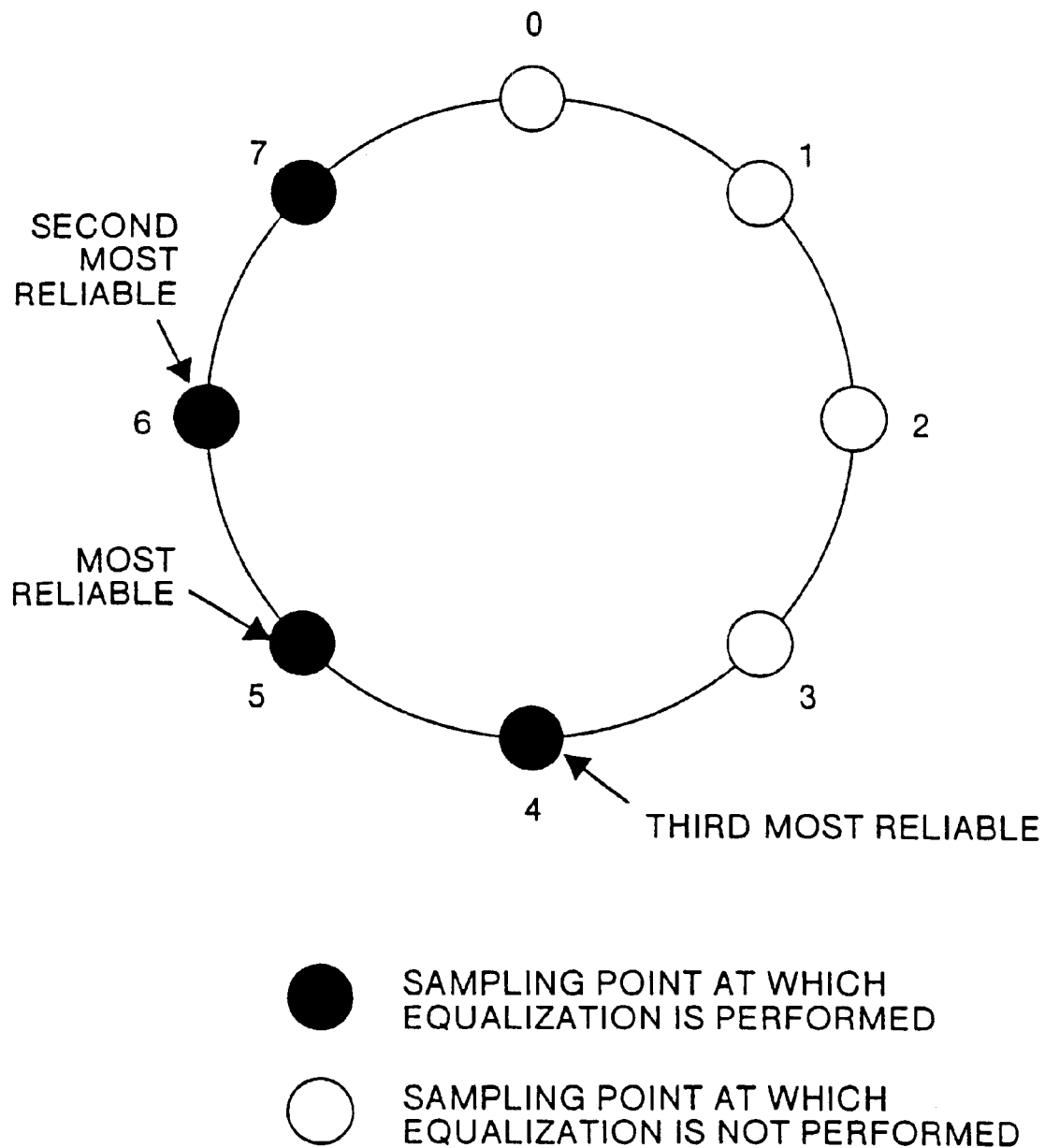
FIG. 8 is over-sample timing numbers which are changed by a received signal output circuit.
Figure 9:
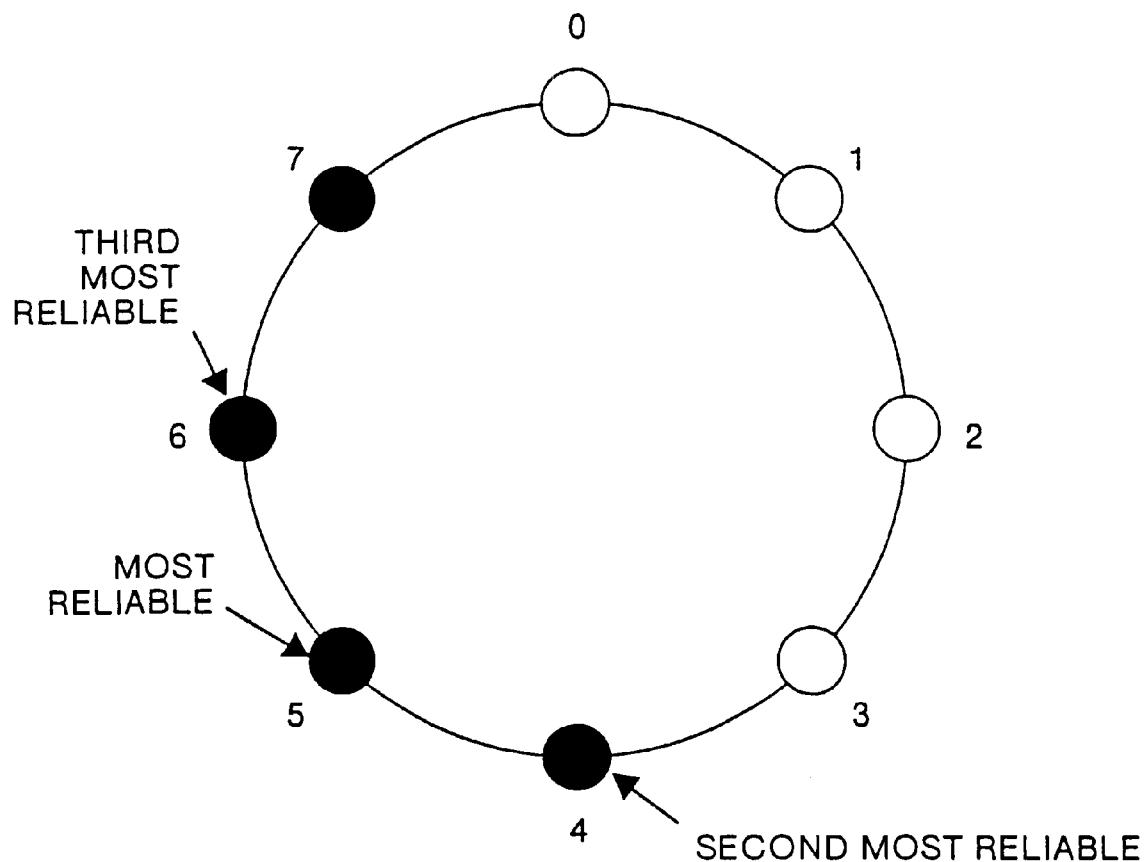
FIG. 9 is a diagram showing a state that reliability of the over-sampling timing numbers changes.

Next, when UW synchronization is established and at this time the over-sample timing number '6' is the most reliable and the over-sample timing number '4' is the second most reliable, the over-sample timing number is changed into '4', '5', '6' and '7', for example, namely, timing at which the reliability is estimated to be high with reference to the reliability of FIG. 7. FIG. 8 shows over-sample timing numbers which are changed by the received signal output circuit 4 after synchronization is established.

Next, when the over-sample timing number '5' is most reliable, the over-sample timing number '6' is second most reliable, and the over-sample timing number '4' is third most reliable as shown in FIG. 8, the over-sample timing numbers are not changed until synchronization is off.

Figure 10:
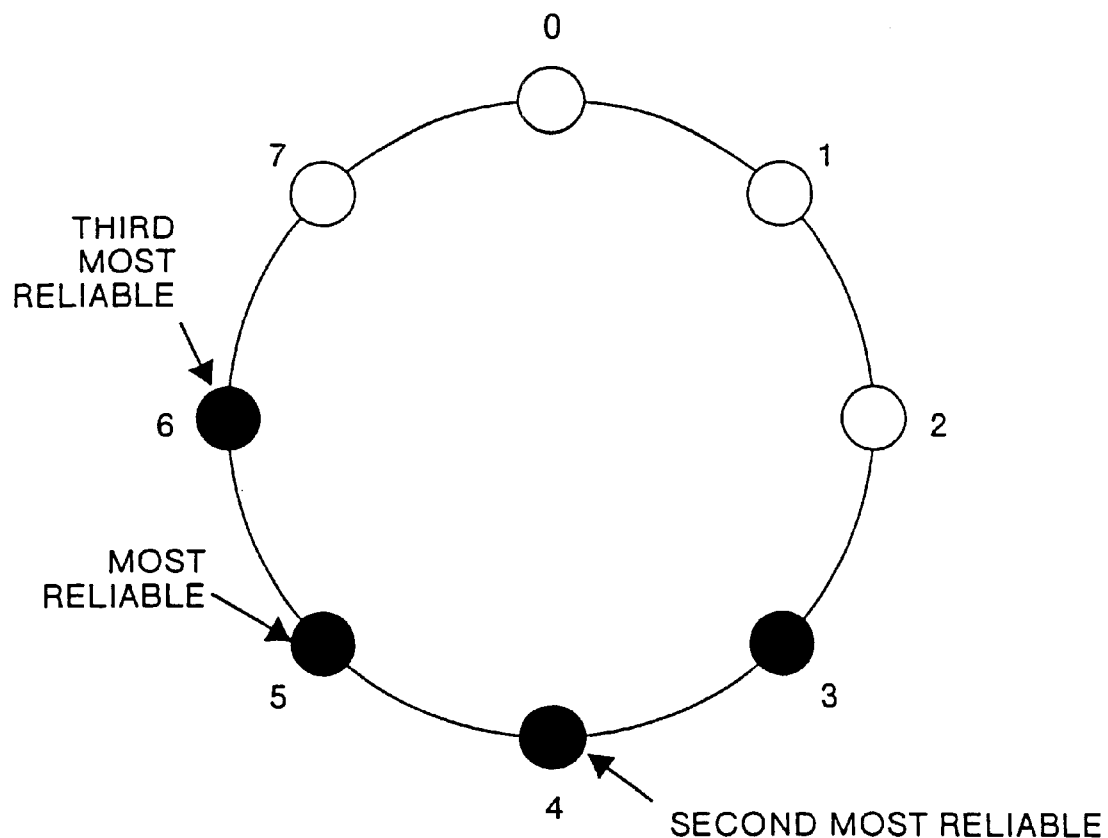
FIG. 10 is a diagram showing changed over-sample timing numbers when the reliability of the over-sample timing numbers changes.
Figure 10:
Figure 10:

When time passes and the over-sample timing number '5' is most reliable, the over-sample timing number '4' is second most reliable, and the over-sample timing number '6' is third most reliable (see FIG. 9), as shown in FIG. 10 for example, the over-sample timing numbers are changed into '3', '4', '5' and '6'. As mentioned above, FIG. 9 is a diagram showing the case where the reliability of the over-sample timing numbers are changed. FIG. 10 is a diagram showing the changed over-sample timing numbers when the reliability of the over-sample timing numbers is changed.

In the present embodiment, when synchronization is established, the over-sample timing numbers selected by the received signal output circuit 4 are changed according to fluctuation in the reliability. As a result, the effect which is similar to that of the first embodiment can be obtained, and establishment or un-establishment of synchronization is judged by utilizing the UW detector 7. For example, when synchronization is not established, intervals between the over-sample timing numbers are distributed thoroughly. Meanwhile, when synchronization is established, the intervals between the over-sample timing numbers are set finely so that accuracy of the timing synchronization is heightened. As a result, satisfactory characteristic can be realized by a small number of blind equalizers with reliability information.

Figure 11:
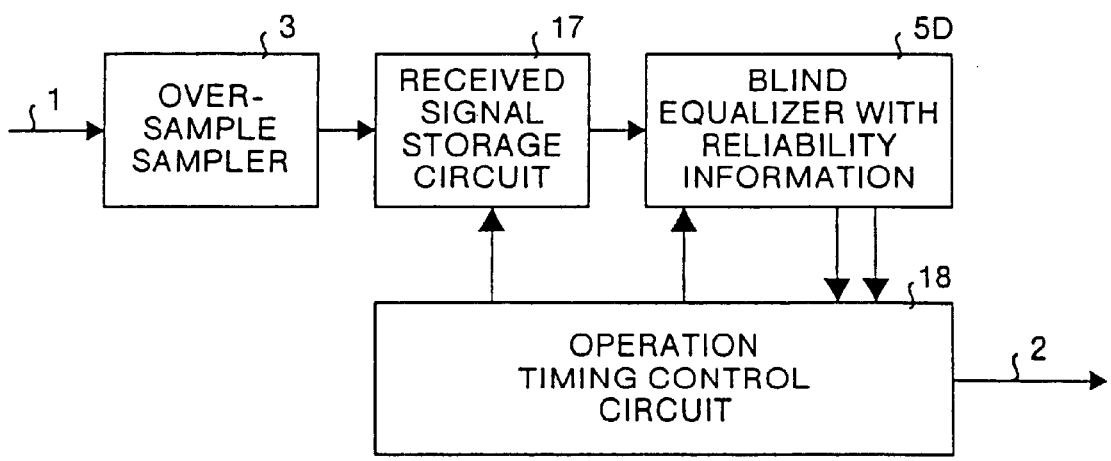
FIG. 11 shows a structure of the receiver according to a third embodiment of the present invention.

FIG. 11 shows a structure of the receiver according to a third embodiment of the present invention. In FIG. 11, legend 1 denotes the received signal input terminal, legend 2 denotes the decision value output terminal, legend 3 denotes the over-sample sampler, legend 5D denotes the blind equalizer with reliability information, legend 17 denotes a received signal storage circuit, and legend 18 denotes an operation timing control circuit.

At first, a received signal is sampled by the over-sample sampler 3 at a speed which is not less than a symbol rate. Next, the received signal storage circuit 17 once stores the over-sampled received signal, and outputs an over-sample timing number indicated by the operation timing control circuit 18 at specified timing and at a speed which is faster than the symbol rate. Finally, the blind equalizer with reliability information 5D receives a received sequence at a speed faster than the symbol rate, and outputs reliability information and decision data. In the present embodiment, the operation timing control circuit 18 compares reliabilities corresponding to the over-sample timing numbers, and outputs decision data with the highest reliability as a decision value. Moreover, the blind equalizer with reliability information 5D has, for example, the aforementioned structure shown in FIG. 2 and FIG. 3.

In addition, in the present embodiment, a plural pieces of reliability information and decision data are not once held as mentioned above, but for example, only the reliability information is once held, and the over-sample timing number with the highest reliability is selected. Thereafter, the blind equalizer with reliability information is operated for the received sequence corresponding to the selected over-sample timing number so that a decision value may be obtained. Moreover, when parameters of the respective blind equalizers with reliability information are different from one another, weighting factors which are multiplied by the reliability information are different from one another (normally, all the weight factors are 1 but the weight factor is 1 for a certain parameter, and the weighting factor is 2 for another parameter). As a result, selecting accuracy of a decision value can be improved.

Figure 12:
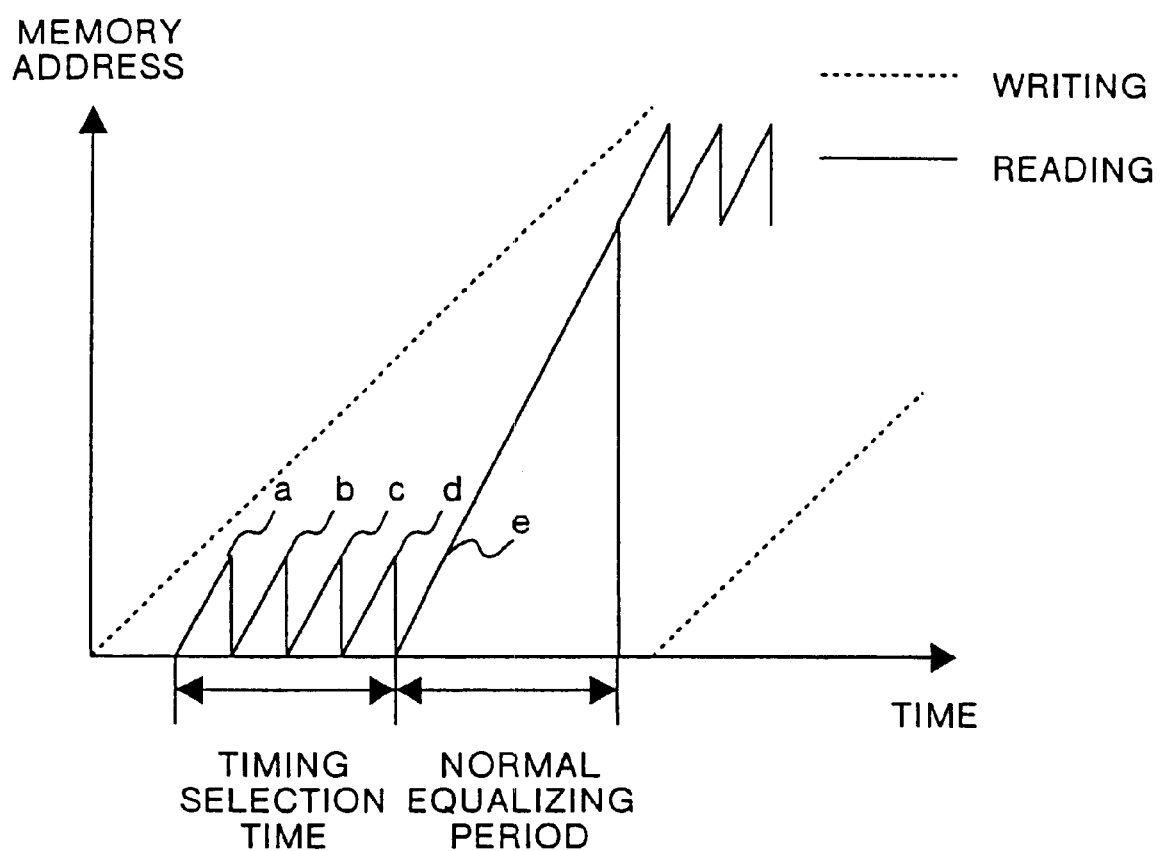
FIG. 12 is a diagram showing a relationship between a writing process and a reading process when a dual port RAM is imaged as a received signal storage circuit.

FIG. 12 is a diagram showing a relationship between a writing process and a reading process of a received signal in the operation timing control circuit 18 when a dual port RAM is imaged as the received signal storage circuit 17 in the receiver having the above structure. In the present embodiment, the operation timing of the received signal storage circuit 17 is controlled as shown in the drawing. In this example, a speed of the received sequence output from the received signal storage circuit 17 is twice as fast as a symbol rate. Moreover, it is assumed that the received signal is 8-time sampled by the over-sample sampler 3.

At first, in FIG. 12, at the time when the received signal is stored in the received signal storage circuit 17 to some degree, namely, a received sequence with the over-sample timing number '0' of about ¼ of actual data length is processed by the blind equalizer with reliability information 5 at timing a so that reliability information is obtained. Next, at timing b, a received sequence with the over-sample timing number '2' is processed in a similar manner. At timing c, a received signal with the over-sample timing number '4' is processed in a similar manner. At timing d, a received sequence with the over-sample timing number '6' is processed in a similar manner.

In such a manner, the reliability information is created for the received sequences with the four over-sample timing numbers, and a period required for selecting the over-sample timing number with the highest reliability shows a timing selecting period shown in the drawing.

In addition, the blind equalizer with reliability information 5D receives the received sequence with the selected over-sample timing number at timing e, and decision data for actual data length are output. In the present embodiment, the operation shown in FIG. 12 is performed repeatedly.

In the present embodiment, the operation shown in FIG. 12 is performed so that the decision values can be output stably without utilizing a training sequence similarly to the firth and second embodiments. Moreover, the received signal is once stored in the received signal storage circuit 17, and the operating speed of the blind equalizer with reliability information 5D is doubled so that the above process can be processed for actual time.

In addition, in the present embodiment, when an operating clock of the blind equalizer with reliability information 5D is set to be higher, when a length of the received sequence to be used for obtaining reliability information is set to be longer than a length of the decision value sequence, the process can be performed for actual time.

Figure 13:
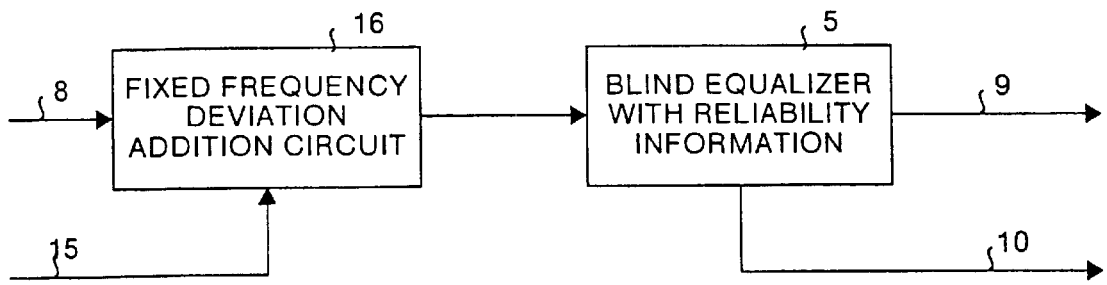
FIG. 13 is a diagram showing a structural example of a blind equalizer with reliability information different from FIG. 2 and FIG. 3.

FIG. 13 is a diagram showing a structural example of the blind equalizer with reliability information 5D different from FIG. 2 and FIG. 3. Here, the blind equalizer with reliability information 5 shown in FIG. 13 is the blind equalizer with reliability information shown in FIG. 2 or FIG. 3, and it is similar to that shown in FIG. 4 except that a fixed frequency deviation input terminal is provided.

In addition, in the receiver shown in FIG. 11, the operation timing control circuit 18 may control (change) parameters of the blind equalizers forcibly. More concretely, for example, a channel memory length and a frequency deviation to be given by the fixed frequency deviation addition circuit 16 are changed as parameters. When such a function is added so that, in the present embodiment, frequency coverage where the receiver operates can be enlarged, and a stable operation in a wider channel can be performed.

Figure 14:
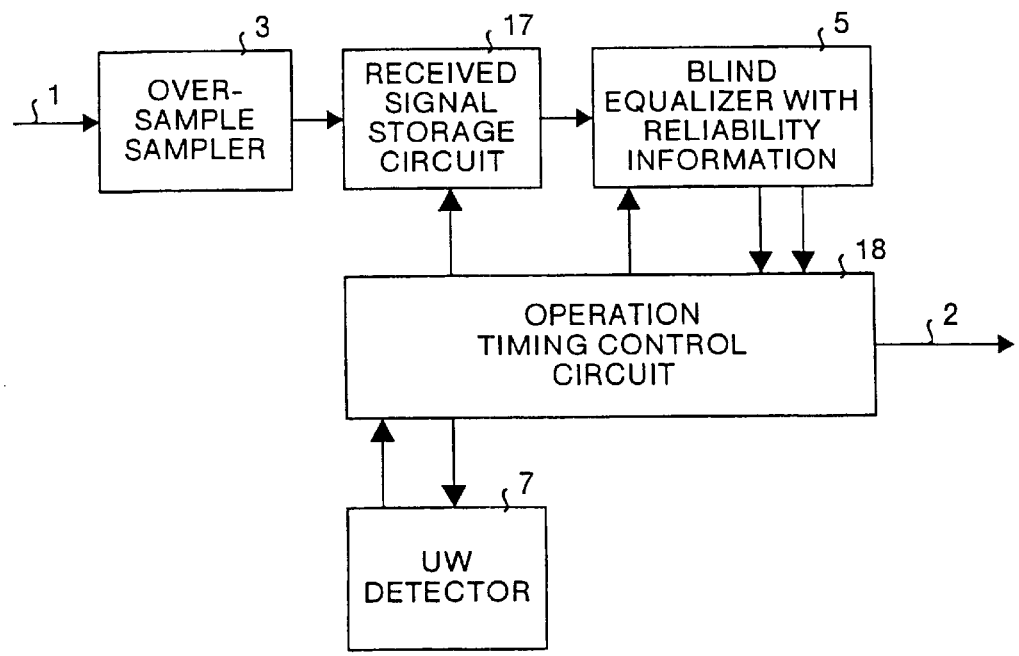
FIG. 14 shows a structure of the receiver according to a fourth embodiment of the present invention.

FIG. 14 shows a structure of the receiver according to a fourth embodiment of the present invention. In the present embodiment, the same legends are provided to the components which are the same as those in the aforementioned third embodiment, and the description thereof is omitted. In FIG. 14, legend 7 denote a UW (unique word) detector.

In the present embodiment, the operation which is the same as that in the third embodiment is basically performed, but a difference with the third embodiment is that the UW detector 7 performs UW detection utilizing a decision value and makes a judgment as to whether the receiver is in the synchronous state or in the asynchronous state. Namely, the present embodiment is characterized in that an over-sample timing number of a received sequence output by the received signal storage circuit 17 is changed by the above judging process. Since this changing method is the same as that shown in FIG. 7 to FIG. 10, the description thereof is omitted.

In the present embodiment, similarly to the third embodiment, an addition value of a frequency deviation and parameters of blind equalizers can be changed, and the over-sample timing number of the received sequence output by the symbol rate received signal output circuit 4 is changed according to circumstances. When such a function is added, the effect similar to that in the third embodiment can be obtained, and enlargement of frequency coverage where the receiver operates and the stable operation in a wide channel can be realized accurately.

Figure 15:
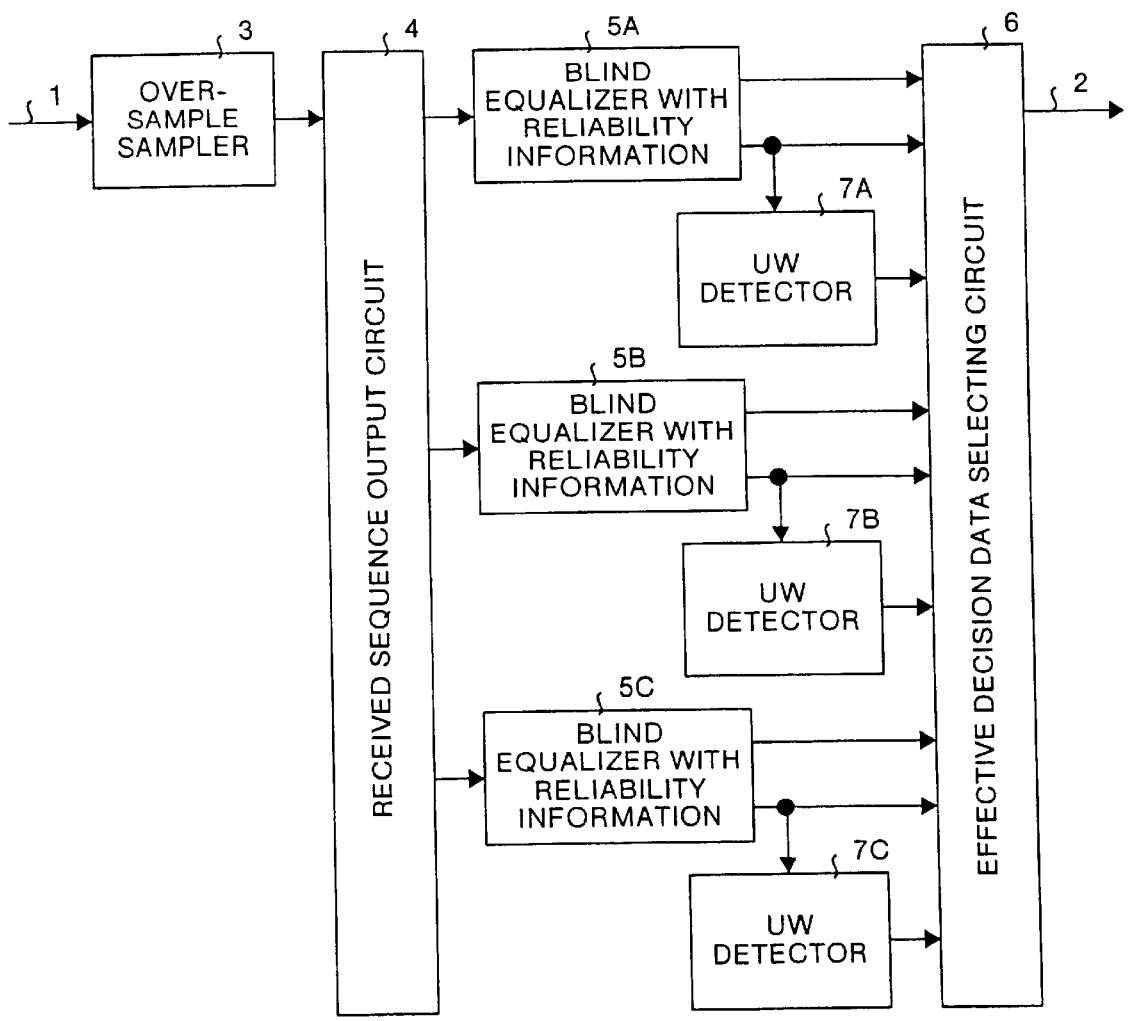
FIG. 15 shows a structure of the receiver according to a fifth embodiment of the present invention.

FIG. 15 shows a structure of the receiver according to a fifth embodiment of the present invention. In the present embodiment, the same legends are provided to the components which are the same as those in the aforementioned first embodiment, and the description thereof is omitted. In FIG. 15, legends 7A, 7B and 7C denote UW detectors.

In the present embodiment, the operation which is the same as that in the first embodiment is basically performed, but a difference with the first embodiment is that, for example, the UW detectors 7A, 7B and 7C perform UW detection on decision data output by blind equalizers with reliability information 5A, 5B and 5C, and output the detected results and detection timing. The decision data selecting circuit 6 selects a decision value utilizing not only reliability information but also the UW detected results and the detection timing (synchronous/asynchronous information) Since details about synchronization/non-synchronization are similar to those in FIG. 6, the description thereof is omitted.

As mentioned above, in the present embodiment, similarly to the first embodiment, it is not necessary to utilize a training sequence, and a decision value in the adaptive equalizer process can be output only by the process using the blind equalizers with reliability information.

Further, in the present embodiment, the UW detectors 7A, 7B and 7C output the UW detected results and the detection timing based on the decision data obtained by the blind equalizers with reliability information 5A, 5B and 5C. The decision data selecting circuit 6 selects a judged result based on the UW detected results and the detection timing. For this reason, in comparison with the case where a decision value is selected based on only reliability information, decision data with higher accuracy can be output.

Figure 16:
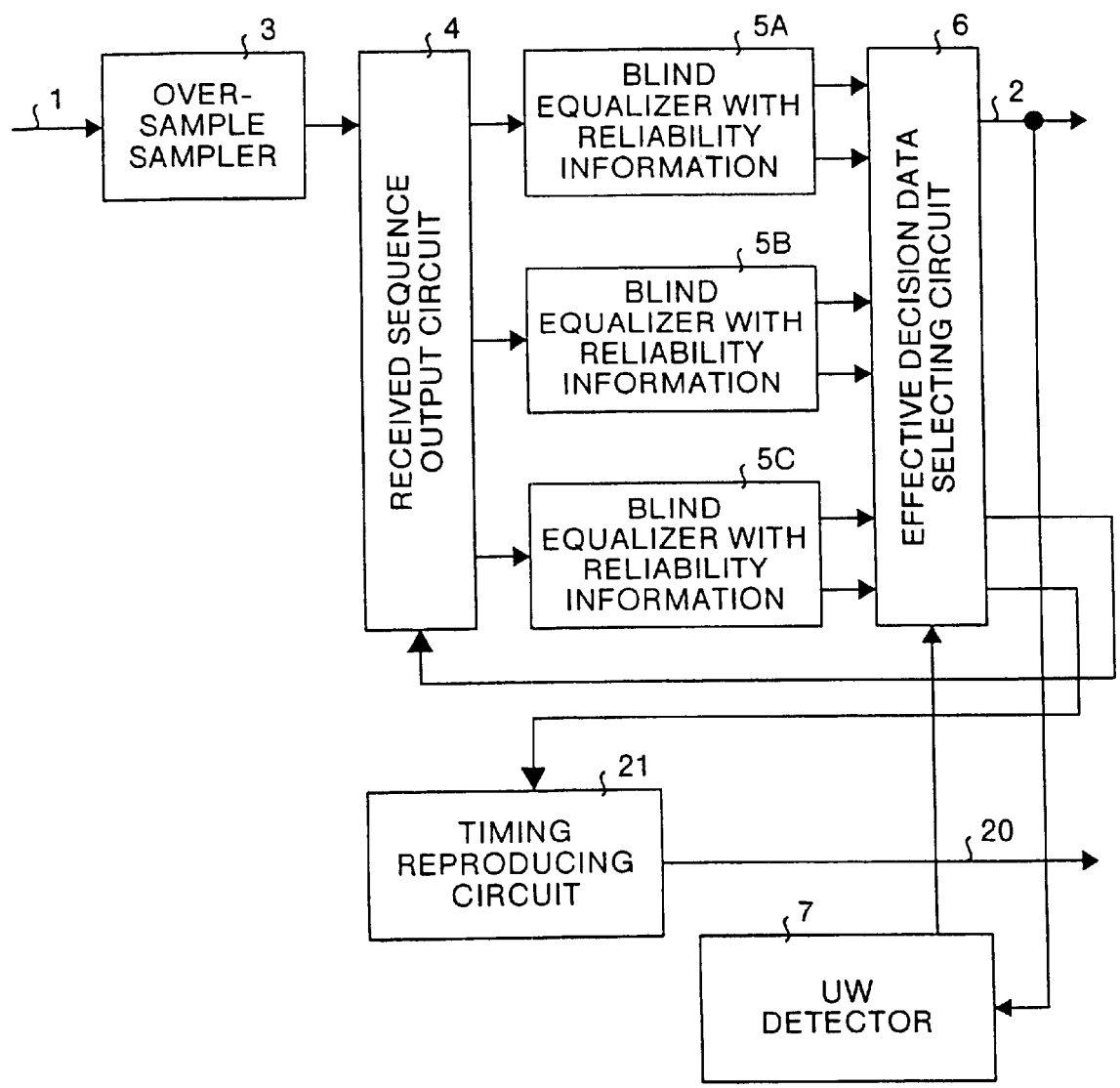
FIG. 16 shows a structure of the receiver according to a sixth embodiment of the present invention.

FIG. 16 shows a structure of the receiver according to a sixth embodiment of the present invention. In the present embodiment, the same legends are provided to the components which are the same as those in the aforementioned first or second embodiments, and the description thereof is omitted. In FIG. 16, legend 20 denotes a reproduction timing output terminal, and legend 21 denotes a timing reproducing circuit.

In the present embodiment, the operation which is the same as that in the second embodiment is basically performed, but a difference with the second embodiment is that, for example, the decision data selecting circuit 6 creates timing information including finally selected timing and a UW detected result of the UW detector 7. Further, the timing reproducing circuit 21 outputs a reproduction timing signal based on the timing information to be a reference.

In the present embodiment, in the same manner as in the first embodiment, it is not necessary to utilize a training sequence, and a decision value in the adaptive equalizer process can be output only by the process using the blind equalizers with reliability information.

In addition, in the present embodiment, in the same manner as in the second embodiment, for example, intervals of the over-sample timing numbers are distributed thoroughly when synchronization is not established, whereas the intervals of the over-sample timing numbers can be set finely when synchronization is established. Additionally, the timing reproducing circuit 21 outputs a reproduction timing signal based on the timing information created by the decision data selecting circuit 6 so that accuracy of timing synchronization can be heightened. For this reason, in comparison with the second embodiment, a more satisfactory demodulation characteristic can be realized.

Figure 17:
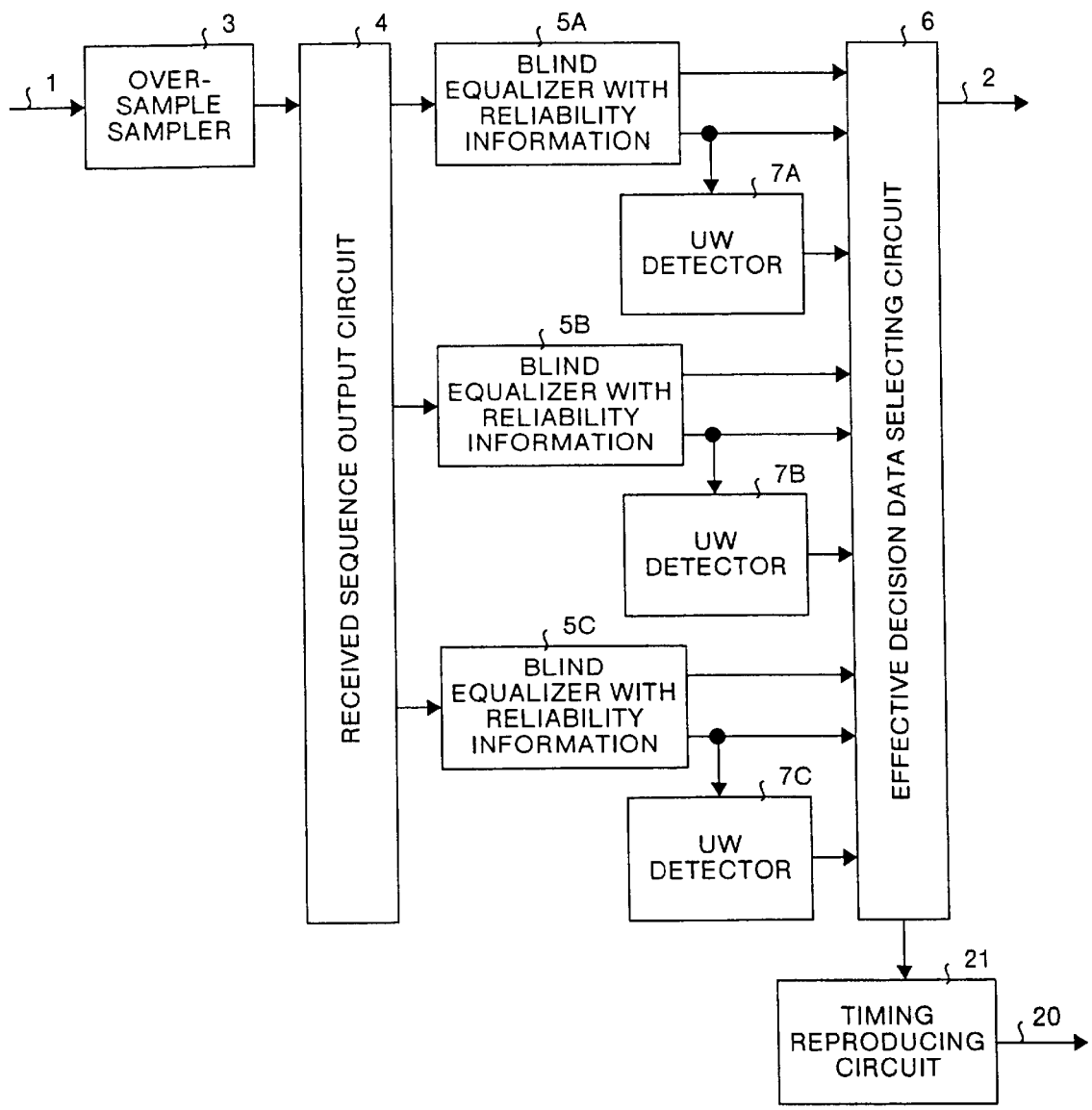
FIG. 17 shows a structure of the receiver according to a seventh embodiment of the present invention.

FIG. 17 shows a structure of the receiver according to a seventh embodiment of the present invention. In the present embodiment, the same legends are provided to the components which are the same as those in the aforementioned first, second, fifth or sixth embodiments, and the description thereof is omitted. In FIG. 17, legend 20 denotes the reproduction timing output terminal, and legend 21 denotes the timing reproducing circuit.

In the present embodiment, the operation which is the same as that in the fifth embodiment is performed basically, but a difference with the fifth embodiment is that, for example, the decision data selecting circuit 6 creates timing information including finally selected timing and a UW detected result of the UW detector corresponding to a selected equalizer, and the timing reproducing circuit 21 outputs a reproduction timing signal based on the timing information to be a reference.

In the present embodiment, in the same manner as in the first embodiment, it is not necessary to utilize a training sequence, and a decision value in the adaptive equalizer process can be output only by the process using the blind equalizers with reliability information.

In addition, in the present embodiment, in the same manner as in the fifth embodiment, the UW detectors 7A, 7B and 7C output UV detected results and their detection timing based on decision data obtained by the corresponding blind equalizers with reliability information 5A, 5B and 5C. The decision data selecting circuit 6 selects a decision value based on the UW detected results and the detection timing. For this reason, in comparison with the case where a decision value is selected based on only reliability information, decision data with higher accuracy can be output.

In addition, in the present embodiment, similarly to the sixth embodiment, in addition to the above effect, the timing reproducing circuit 21 outputs a reproduction timing signal based on the timing information created by the decision data selecting circuit 6 so that accuracy of timing synchronization can be heightened. For this reason, more satisfactory demodulation characteristic can be realized in comparison with the sixth embodiment.

Figure 18:
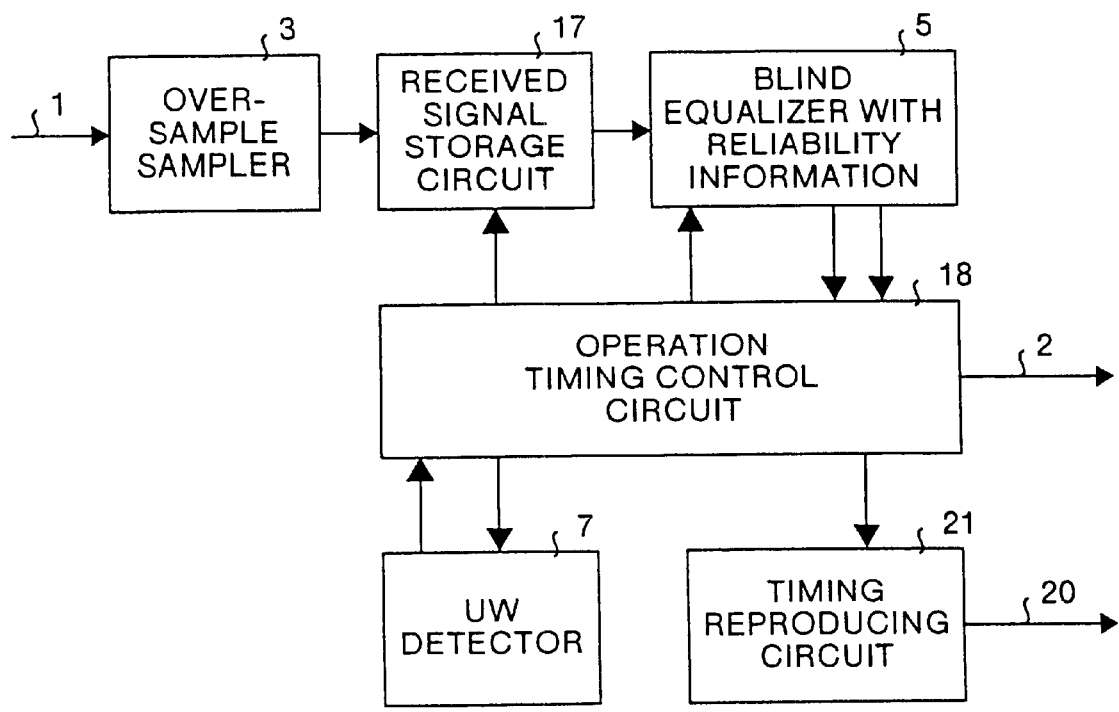
FIG. 18 shows a structure of the receiver according to an eighth embodiment of the present invention.

FIG. 18 shows a structure of the receiver according to an eighth embodiment of the present invention. In the present embodiment, the same legends are provided to the components which are the same as those in the aforementioned third or fourth embodiments, and the description thereof is omitted. In FIG. 18, legend 20 denotes the reproduction timing output terminal, and legend 21 denotes the timing reproducing circuit.

In the present embodiment, the operation which is the same as that in the fourth embodiment is performed basically, but a difference with the fourth embodiment is that, for example, the operation timing control circuit 18 creates timing information including finally selected timing and a UW detected result of the UW detector 7, and the timing reproducing circuit 21 outputs a reproduction timing signal based on the timing information to be a reference.

In the present embodiment, in the same manner as in the third and fourth embodiments, an addition value of frequency deviation and parameters of the blind equalizer can be changed, and enlargement of frequency coverage where the receiver operates and a stable operation in a wider channel can be realized more accurately.

In addition, in the present embodiment, the timing reproducing circuit 21 outputs a reproduction timing signal based on the timing information created by the operation timing control circuit 18 so that accuracy of timing synchronization can be heightened. For this reason, more satisfactory demodulation characteristic can be realized in comparison with the third or forth embodiments.

Figure 19:
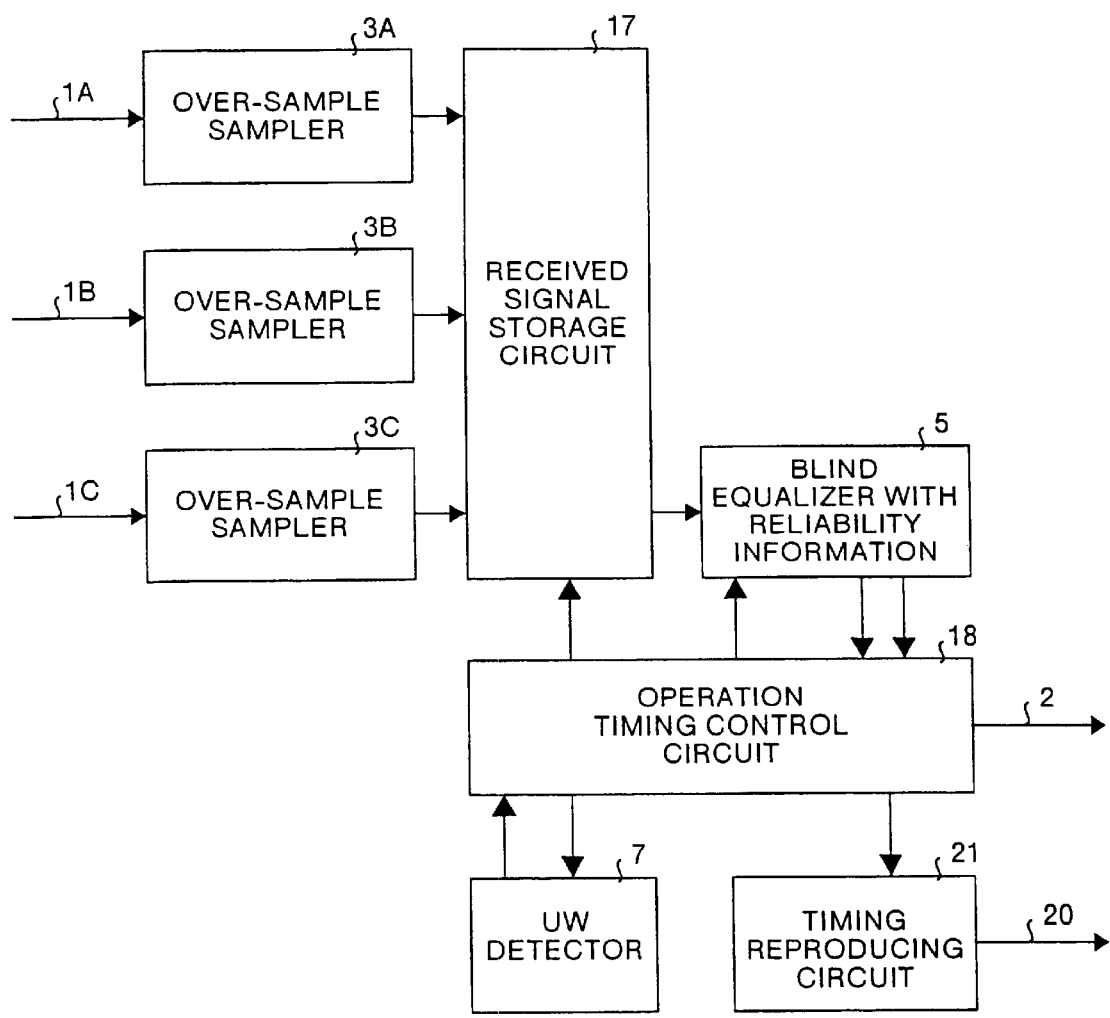
FIG. 19 shows a structure of the receiver according to a ninth embodiment of the present invention.
Figure 20:
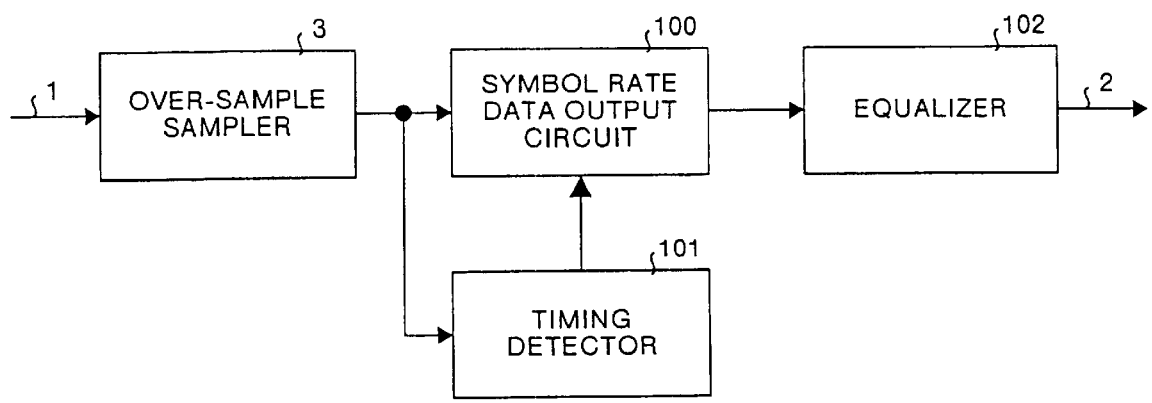
FIG. 20 shows a structure of an adaptive equalizer adopted in a conventional receiver.
Figure 21:
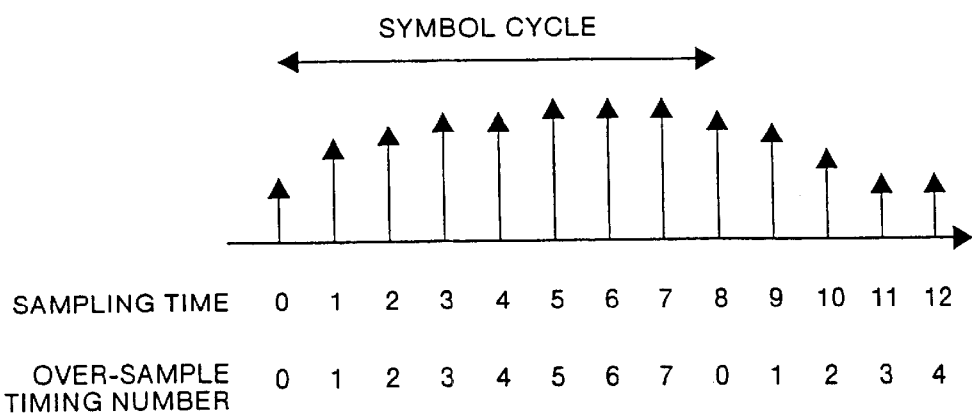
FIG. 21 is a diagram showing a principle of the over-sample by the receiver.
Figure 22:
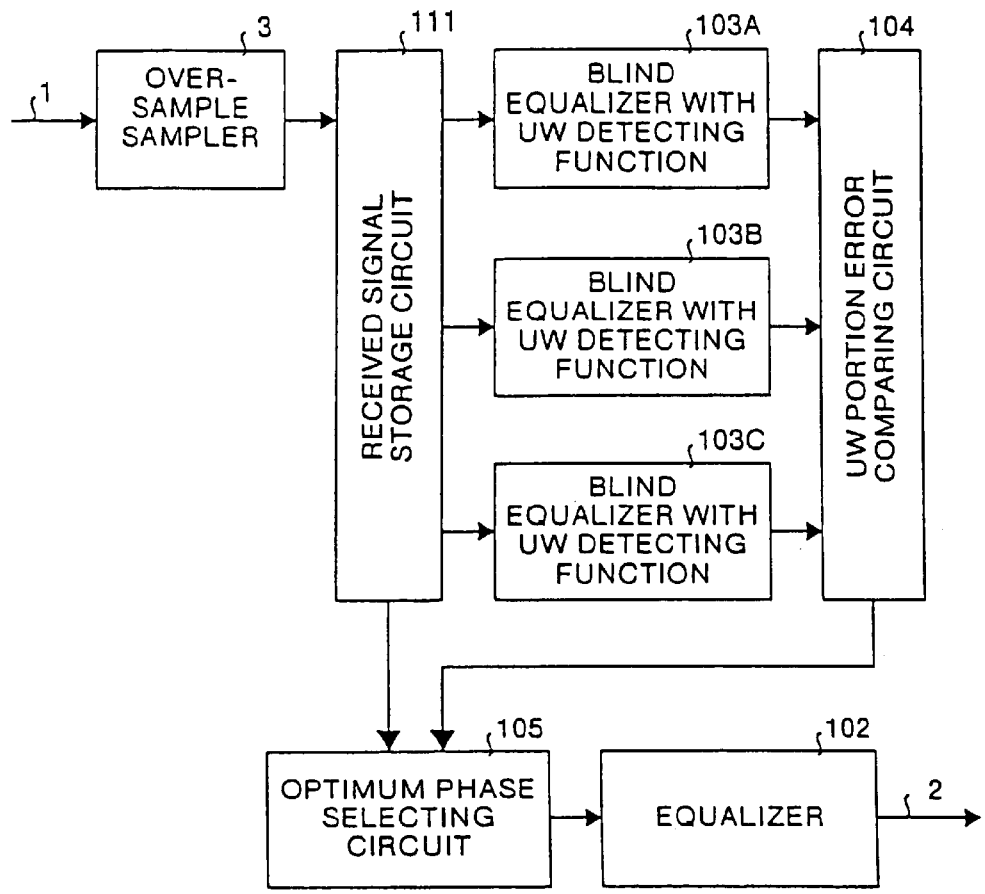
FIG. 22 shows a structure of a conventional receiver.
Figure 23:
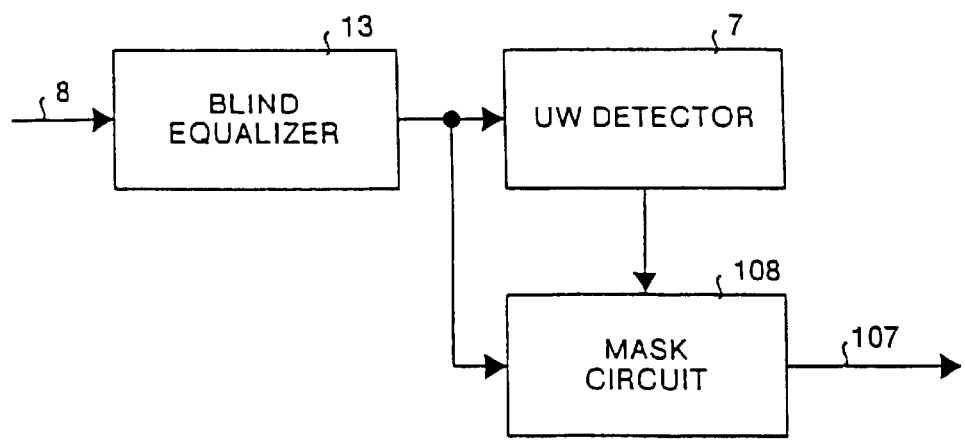
FIG. 23 shows a structure of a blind equalizer with UW detecting function.

FIG. 19 shows a structure of the receiver according to a ninth embodiment of the present invention. In the present embodiment, the same legends are provided to the components which are the same as those in the aforementioned firth to eight embodiments, and the description thereof is omitted. In FIG. 19, legends 1A, 1B and 2C denote received signal input terminals, and legends 3A, 3B and 3C denote oversample samplers.

In the present embodiment, the operation which is the same as that in the eighth embodiment is performed basically, but a difference with the eighth embodiment is that a plurality of received signal input terminals and oversample samplers exist. Here, an operation clock of the blind equalizer with reliability information 5 is set to be a larger value, and the operation timing control circuit 18 is set to be capable of processing a plurality of different received signals.

In the present embodiment, in the same manner as in the third and fourth embodiments, an addition value of frequency deviation and parameters of the blind equalizer can be changed. Moreover, enlargement of frequency coverage where the receiver operates and a stable operation in a wider channel can be realized accurately.

In the present embodiment, the timing reproducing circuit 21 outputs a reproduction timing signal based on timing information created by the operation timing control circuit 18 so that accuracy of timing synchronization can be heightened. For this reason, more satisfactory demodulation characteristic can be realized in comparison with the third or fourth embodiments.

Further, in the present embodiment, a plurality of the received signal input terminals and over-sample samplers are provided so that the one blind equalizer with reliability information 5 can process a plurality of different received signals.

INDUSTRIAL APPLICABILITY

As mentioned above, the receiver and the adaptive equalizer method of the present invention are useful for wireless communication such as mobile telephone, and particularly suitable for portable wireless communication equipments which are used in communication environments that intersymbol interference occurs due to multipath propagation.

What is claimed is:

1. A receiver having an adaptive equalizer which judges a transmission data sequence by an adaptive equalizer process, said receiver comprising:

a sampling unit which samples a received signal at a speed of not less than a symbol rate;

a signal sequence distributing unit which outputs at least one signal sequence based on the sampled signal, each signal sequence having a different sampling timing;

a plurality of blind equalization units with reliability information which output decision values and their reliability information correspondingly to the respective signal sequences without utilizing a training sequence; and a decision value selecting unit which selects an optimum decision value based on the reliability information.

2. The receiver according to claim 1, wherein said blind equalization unit with reliability information includes, a blind equalization unit which outputs soft decision values in which reliability for each symbol is added to the decision values; and a reliability accumulation unit which receives the soft decision values per symbol and outputs a cumulative value of the reliabilities as reliability information.

3. The receiver according to claim 1, wherein said blind equalization unit with reliability information includes, a blind equalization unit which receives the signal sequence and outputs square errors which are generated when data are judged as well as the decision values; and a reliability accumulation unit which outputs a cumulative value of the square errors as reliability information.

4. The receiver according to claim 1 further comprising:

a frequency deviation addition unit, which adds a frequency deviation to the received signal, provided at a stage before said blind equalization unit with reliability information.

5. The receiver according to claim 1 further comprising:

a synchronization judging unit which performs unique word detection to obtain synchronization utilizing the decision values output by said plurality of blind equalization units with reliability information to detect whether the received signal is in a synchronous state or in an asynchronous state.

6. A receiver having an adaptive equalizer which judges a transmission data sequence by an adaptive equalizer process, said receiver comprising:

a sampling unit which samples a received signal at a speed of not less than a symbol rate;

a signal storage unit which stores the sampled signal;

a blind equalization unit with reliability information which receives a signal sequence from said signal storage unit and outputs decision values and their reliability information without utilizing a training sequence operating at a clock faster than a signal sequence cycle; and a timing control unit which controls a timing at which the signal sequence is output from the signal storage and which controls a timing of said blind equalization unit with reliability information to output decision data with the highest reliability as decision values.

7. The receiver according to claim 6, wherein said blind equalization unit with reliability information includes,
   a blind equalization unit which outputs soft decision values in which reliability for each symbol is added to the decision values; and
   a reliability accumulation unit which receives the soft decision values per symbol and outputs a cumulative value of the reliability as reliability information.

8. The receiver according to claim 6, wherein said blind equalization unit with reliability information includes,
   a blind equalization unit which receives the signal sequence and outputs square errors which are generated when data are judged as well as the decision values; and
   a reliability accumulation unit which outputs a cumulative value of the square errors as reliability information.

9. The receiver according to claim 6 further comprising:
   a frequency deviation addition unit, which adds a frequency deviation to the received signal, provided at a stage before said blind equalization unit with reliability information.

10. The receiver according to claim 6, wherein a length of a channel memory which is a parameter of the blind equalization unit with reliability information and the frequency deviation can be controlled.

11. The receiver according to claim 6 further comprising:
    a synchronization judging unit which performs unique word detection to obtain synchronization using the decision values and making a judgment whether the received signal is in a synchronous state or in an asynchronous state.

12. The receiver according to claim 1 further comprising:
    a synchronization judging unit which performs unique word detection to obtain synchronization for each of said plural blind equalization units with reliability information and making a judgment whether the received signal is in a synchronous state or in an asynchronous state individually.

13. The receiver according to claim 5 further comprising:
    a reproduction timing generating unit which generates a reproduction timing signal based on timing information including output timing of the optimum decision value and the unique word detected result.

14. The receiver according to claim 12 further comprising:
    a reproduction timing generating unit which generates a reproduction timing signal based on timing information including output timing of the optimum decision value and the unique word detected result.

15. The receiver according to claim 11 further comprising:
    a reproduction timing generating unit which generates a reproduction timing signal based on timing information including output timing of the decision value and the unique word detected result.

16. The receiver according to claim 15, wherein said sampling unit samples a plurality of received signals individually at a speed of not less than a symbol rate.

17. An adaptive equalizer method of judging a transmission data sequence, the method comprising:
    the sampling step of sampling a received signal at a speed of not less than a symbol rate;
    the signal sequence distributing step of outputting at least one signal sequence based on the sampled signal, each signal sequence having a different sampling timing;
    the decision value/reliability information output step of outputting decision values and their reliability information correspondingly to the respective signal sequences without utilizing a training sequence; and
    the decision value selecting step of selecting an optimum decision value based on the reliability information.

18. The adaptive equalizer method according to claim 17, wherein the decision value/reliability information output step includes,
    the soft decision value output step of outputting soft decision values to which reliability of each symbol is added; and
    the reliability cumulative step receiving the soft decision values of each symbol so as to output a cumulative value of the reliabilities as reliability information.

19. The adaptive equalizer method according to claim 17, wherein the decision value/reliability information output step includes,
    the square error output step of receiving the signal sequence and outputs square errors which are generated when data are judged as well as the decision values; and
    the reliability cumulative step of outputting a cumulative value of the square errors as reliability information.

20. The adaptive equalizer method according to claim 17 further comprising:
    the frequency deviation adding step, of adding a frequency deviation to the received signal, before the decision value/reliability information output step is executed.

21. The adaptive equalizer method according to claim 17 further comprising:
    the synchronization judging step of performing unique word detection to obtain synchronization using said plurality of decision values and making a judgment whether the received signal is in a synchronous state or in an asynchronous state.

22. An adaptive equalizer method of judging a transmission data sequence, the method comprising:
    the sampling step of sampling a received signal at a speed of not less than a symbol rate;
    the signal storage step of storing the sampled signal;
    the decision value/reliability information output step of receiving a signal sequence stored at the signal storage step and operating at a clock faster than a signal sequence cycle so as to output decision values and their reliability information without utilizing a training sequence; and
    timing control step of controlling a timing at which the signal sequence is output by the signal storage step and which controls a timing of the decision value/reliability information output step so as to output decision data with the highest reliability as a decision value.

23. The adaptive equalizer method according to claim 22, wherein the decision value/reliability information output step includes,
    the soft decision value output step of outputting soft decision values in which reliability of each symbol is added to the decision values; and
    the reliability cumulative step of receiving the soft decision values of each symbol and outputs a cumulative value of the reliabilities as reliability information.

24. The adaptive equalizer method according to claim 22, wherein the decision value/reliability information output step includes,
    the square error output step of receiving the signal sequence and outputs square errors which are generated when data are judged as well as the decision values; and the reliability cumulative step of a cumulative value of the square errors as reliability information.

25. The adaptive equalizer method according to claim 22 further comprising:

the frequency deviation adding step, of adding a frequency deviation to the received signal, before the decision value/reliability information output step is executed.

26. The adaptive equalizer method according to claim 22, wherein a length of channel memory which is a parameter at the decision value/reliability information output step and the frequency deviation can be controlled.

27. The adaptive equalizer method according to claim 22 further comprising:

the synchronization judging step of performing unique word detection to obtain synchronization utilizing the decision values and making a judgment whether the received signal is in a synchronous state or in an asynchronous state.

28. The adaptive equalizer method according to claim 17 further comprising:

the synchronization judging step of performing unique word detection to obtain synchronization in the unit of the decision value/reliability information output step of outputting the decision values and their reliabilities and making a judgment whether the received signal is in a synchronous state or in an asynchronous state.

29. The adaptive equalizer method according to claim 21 further comprising:

the reproduction timing generating step of generating a reproduction timing signal based on timing information including output timing of the optimum decision value and the unique word detected result.

30. The adaptive equalizer method according to claim 28 further comprising:

the reproduction timing generating step of generating a reproduction timing signal based on timing information including output timing of the optimum decision value and the unique word detected result.

31. The adaptive equalizer method according to claim 27 further comprising:

the reproduction timing generating step of generating a reproduction timing signal based on timing information including output timing of the decision values and the unique word detected result.

32. The adaptive equalizer method according to claim 31, wherein the sampling step samples a plurality of received signals at a speed of not less than a symbol rate individually.

* * * * *

UNITED STATES PATENT AND TRADEMARK OFFICE
CERTIFICATE OF CORRECTION

PATENT NO.    : 6,560,278 B2
DATED         : May 6, 2003
INVENTOR(S)   : Kubo et al.

It is certified that error appears in the above-identified patent and that said Letters Patent is hereby corrected as shown below:

<u>Title page,</u>
Item [63], Related U.S. Application Data should be inserted to read:
--       Related U.S. Application Data
 [63] Continuation of application No. PCT/JP00/03843, filed on Jun. 14, 2000. --

<u>Column 1,</u>
Line 3, insert:
-- This application is a Continuation of International application No. PCT/JP00/03843, filed on June 14, 2000. --

Signed and Sealed this

Second Day of September, 2003

JAMES E. ROGAN
*Director of the United States Patent and Trademark Office*